(12) United States Patent
Shimabara

(10) Patent No.: US 6,836,728 B2
(45) Date of Patent: Dec. 28, 2004

(54) NAVIGATION DEVICE AND METHOD FOR DISPLAYING FACILITY MARK USING THE SAME

(75) Inventor: Daisuke Shimabara, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 35 days.

(21) Appl. No.: 10/171,082

(22) Filed: Jun. 12, 2002

(65) Prior Publication Data
US 2003/0023374 A1 Jan. 30, 2003

(30) Foreign Application Priority Data
Jun. 15, 2001 (JP) ........................................ 2001-181586

(51) Int. Cl.[7] .............................................. G06F 19/00
(52) U.S. Cl. ........................ 701/212; 340/990; 340/988
(58) Field of Search ................................ 701/200, 212, 701/201, 209; 345/419, 764; 455/456.5; 340/990, 995.16, 988; 700/217

(56) References Cited

U.S. PATENT DOCUMENTS

| | | | | |
|---|---|---|---|---|
| 5,802,492 A | * | 9/1998 | DeLorme et al. | 455/456.5 |
| 6,040,824 A | | 3/2000 | Maekawa et al. | 345/173 |
| 6,064,941 A | | 5/2000 | Nimura et al. | 701/210 |
| 6,067,502 A | * | 5/2000 | Hayashida et al. | 701/209 |
| 6,282,490 B1 | * | 8/2001 | Nimura et al. | 340/995.14 |
| 6,321,158 B1 | * | 11/2001 | DeLorme et al. | 701/201 |
| 6,339,745 B1 | * | 1/2002 | Novik | 701/208 |

* cited by examiner

Primary Examiner—Thomas G. Black
Assistant Examiner—Ronnie Mancho
(74) Attorney, Agent, or Firm—Brinks Hofer Gilson & Lione

(57) ABSTRACT

A navigation device is provided for improving the visibility of a map image including facility information. A map drawing section 14 generates map drawing data for the display of the map image by applying a predetermined scaling factor, and stores the data in the VRAM 16. A facility mark drawing section 22 extracts a predetermined facility from the drawing range of the map image, draws a facility mark corresponding to the facility with its display pattern changed in response to the scaling factor of the map image, and stores the drawing data in the VRAM 16. An image superimposing section 36 merges the drawing data stored in the VRAM 16 and the drawing data provided by an auxiliary image drawing section 34 and the like, to provide the merged data to a display device 6. Based on the drawing data provided by the image superimposing section 36, the map image with the facility marks superimposed thereon is displayed on the screen of the display device 6.

20 Claims, 17 Drawing Sheets

FIG. 9

| BIG GENRE | SMALL GENRE |
|---|---|
| FOOD SERVICE FACILITY | FAMILY RESTAURANT |
| | FAST FOOD RESTAURANT |
| | CHINESE NOODLES RESTAURANT |
| | JAPANESE NOODLES RESTAURANT |
| | ⋮ |
| AUTOMOTIVE SERVICE FACILITY | GAS STATION |
| | AUTOMOTIVE SUPPLY SHOP |
| | CAR DEALER |
| | ⋮ |
| OTHER STORES | CONVENIENCE STORE |
| | DRUGSTORE |
| | BOOKSTORE |
| | DEPARTMENT STORE |
| | ⋮ |

NAVIGATION DEVICE AND METHOD FOR DISPLAYING FACILITY MARK USING THE SAME

BACKGROUND OF THE INVENTION

1. Field of the Invention

The present invention relates to a navigation device that displays facility marks indicating locations of various facilities superimposed on a map image, and a method for displaying the facility marks on the map image using the same.

2. Description of the Related Art

Generally, a conventional vehicle navigation device is designed to detect a present position of a vehicle, to read out map data corresponding to the present vehicle position from an information recording medium such as a CD or a DVD, and to display a map image covering the present vehicle position and its surroundings on a screen. A vehicle position mark indicating the present vehicle position is also displayed on the screen. The map image covering the surroundings can be scrolled together with the travel of the vehicle with the vehicle position mark at the center thereof.

Almost every vehicle navigation device has a facility mark displaying function of displaying facility marks that indicate locations of facilities such as a convenience store and a gas station, superimposed on the map image. The facility mark displaying function displays on the map image the facility marks corresponding to the facilities that belong to several genres designated by a user as the genres of interest (for example, convenience store, gas station, restaurant, and the like). In a case where the facilities to be displayed are franchised stores, these facility marks each are expressed on the screen with the same trademark as described in signboards commonly used by the facilities. Reference to such facility marks allows the user to obtain information on various kinds of facilities (location, business category, the name of franchisor, and the like).

In the conventional navigation device described above, the smaller value the scaling factor of the map image (reduced scale) has, the more closely the facility marks are positioned with respect to each other. In such a case, the facility marks of interest are densely displayed within the specific display range, and a plurality of facility marks are superimposed on one another, thus making it difficult to grasp the facility information.

Further, in general, the smaller value the scaling factor of the map image has, the greater the number of the facilities arranged within the display range of the map image becomes. For this reason, there are provided a great number of facility marks within the screen, and the ratio of the areas occupied by the facility marks to the entire area of the map image becomes higher, thus making it difficult to view the map image.

As described above, in the conventional navigation device, when superimposing the facility marks on the map image, it is often difficult to grasp the facility information expressed by the facility marks and to view the map image. Therefore, the conventional navigation device does not necessarily have sufficient visibility of the map image including the facility information.

SUMMARY OF THE INVENTION

The present invention has been accomplished in view of the above-mentioned technical background, and it is an object of the present invention to provide a navigation device having improved visibility of a map image including the facility information.

To solve the foregoing problems, according to the present invention there is provided a navigation device including a map drawing section for drawing a map image responsive to a predetermined scaling factor, a facility mark drawing section for drawing an image of a facility mark corresponding to a specific facility in a display pattern responsive to the scaling factor, and a display processor for displaying the image of the facility mark drawn by the facility mark drawing section, superimposed on the map image drawn by the map drawing section. In accordance with the present invention, since the image of the facility mark is drawn in the display pattern responsive to the scaling factor of the map image, it is possible to improve the visibility of a map image including the facility information.

Preferably, the facility mark drawing section described above draws the image of the facility mark as a dot image when the value of the scaling factor is a first value or less. Displaying the facility mark by the dot image can make the display area of each facility mark smaller. Thus, even when the value of the scaling factor is set smaller and a great number of facility marks are displayed within the display range of the map image, the ratio of the areas occupied by the facility marks to the entire area of the map image can be restrained to a relatively lesser extent. Accordingly, it is possible to prevent degradation in the visibility of the map image.

The dot image may be drawn in a color corresponding to a genre to which the specific facility belongs. Thus, the genre of the specific facility corresponding to the facility mark can be identified based on the display color.

Further, the navigation device may comprise a dot definition section for setting a relationship between the dot image and the genre of the specific facility corresponding thereto, by a user's operation. The user can set the relationship between the dot image and the genre of the specific facility freely at will.

The navigation device may also comprise an auxiliary image drawing section for drawing an auxiliary image indicating the relationship between the dot image and the genre of the specific facility corresponding thereto. The display processor displays the auxiliary image drawn by the auxiliary image drawing section together with the map image and the facility mark image on the same screen. This configuration can facilitate understanding the relationship between the dot image and the genre of the specific facility corresponding thereto.

Preferably, when a plurality of the dot images are positioned close to each other on the display screen, the facility mark drawing section integrates the plurality of closely positioned dot images into one dot image and draws the one dot image. Thus, integrating the plurality of closely spaced dot images into the one dot image can decrease the display area occupied by the dot images as the facility mark images more effectively, thereby improving the visibility of the map image.

Further, the navigation device may comprise a dot designating section for designating the specific dot image and a first detailed information drawing section to draw an information image indicating the genre or kind of the specific facility corresponding to the dot image which is designated by the dot designating section, when any one of the dot images is designated by the dot designating section. Thus, it is possible to identify the detailed genre or the kind of the specific facility corresponding to the designated dot image.

The dot designating section may also include a specific key for designating a dot image that is positioned near the present vehicle position or the present position of a cursor. When the specific key is operated, the first detailed information drawing section performs a drawing operation for the nearby dot image. Operating only the specific key is sufficient to perform a display of the information image indicating the detailed genre or the kind of the specific facility corresponding to the nearby dot image, thereby promoting operability of the navigation device.

Preferably, when a value of the scaling factor is a second value or less, and a plurality of the facility marks are positioned close to one another on a display screen, the facility mark drawing section draws a collective-facility-mark indicating a genre to which the plurality of facility marks belong. In a case where the value of the scaling factor (reduced scale) is relatively small, that is, where the map image is displayed in a relatively wide range, so as to search a route, to know the genres of the facilities (for example, convenience store, gas station and the like) is sufficient. Thus, a plurality of facility marks positioned close to each other are integrated into the collective-facility-mark indicating the genre thereof, which is displayed on the display screen. As a result, the plurality of facility marks are not superimposed on one another and are not densely displayed within the small display range, thereby improving the visibility of a map image including the facility information.

Further, in a case where the plurality of facility marks belong to the same genre, the facility mark drawing section preferably performs a drawing operation of the collective-facility-mark when the value of the scaling factor is in a range from a third value, which is larger than the second value, through the second value. Thus, the plurality of facility marks belonging to the same genre are integrated into one collective-facility-mark to be displayed, such that the number of the displayed facility marks can be decreased, whereby the visibility of the map image is improved. The user also can understand easily the locations of the facilities belonging to the desired genre.

Further, when the value of the scaling factor is in a range from a third value, which is larger than the second value, through the second value, the facility mark drawing section may perform a drawing operation of the collective-facility-mark for the plurality of facility marks which belong to the same genre. When the value of the scaling factor is a second value or less, the facility mark drawing section may perform the drawing operation of another collective-facility-mark for the plurality of facility marks which belong to different genres, in addition to the drawing operation of the collective-facility-mark for the facility marks belonging to the same genre. When the value of the scaling factor is much smaller, the display locations of respective facility marks are displayed very close to each other on the display screen. For this reason, the plurality of facility marks belonging to different genres are integrated into another collective-facility-mark, such that the number of facility marks on the display screen can be decreased more effectively, to thereby improve the visibility of the map image.

Preferably, the navigation device further comprises a collective-facility-mark definition section for setting a relationship between the collective-facility-mark and the genres of the specific facilities corresponding thereto by a user's operation. The user can set the relationship between the collective-facility-mark and the genres of the specific facilities freely at will.

Further, the navigation device may comprise a collective-facility-mark designating section for designating the specific collective-facility-mark, and a second detailed information drawing section to draw an information image indicating the genres or kinds of the specific facilities corresponding to the collective-facility-mark which is designated by the collective-facility-mark designating section, when any one of the collective-facility-marks is designated by the collective-facility-mark designating section. Accordingly, it is possible to designate the desired collective-facility-mark, and to understand the detailed genres or kinds of the plurality of facilities corresponding thereto.

The collective-facility-mark designating section may include a specific key for designating the collective-facility-mark that is positioned near the present vehicle position or the present position of a cursor. When the specific key is operated, the second detailed information drawing section may perform a drawing operation for the nearby collective-facility-mark. Operating only the specific key is sufficient to perform a display of the information image indicating the detailed genres or the kinds of the specific facilities corresponding to the nearby collective-facility-mark, thereby promoting operability of the navigation device.

Preferably, when the value of the scaling factor is greater than the third value, the map drawing section draws an outline of a specific building, and the facility mark drawing section draws the images of the facility marks relating to the building within the outline of the building. For instance, the specific building may be a building including a plurality of facilities to be drawn as facility marks (for example, a building including a convenience store, a restaurant and the like). In a case where the value of the scaling factor is relatively large, that is, in a case where the map image is a wide view, the facility marks are drawn within the outline of the building in a scattered manner, to thereby facilitate understanding the kinds of facilities within the building.

A method for displaying facility marks indicating the locations of various facilities on a map image, using a navigation device that superimposes the facility marks on the map image, in accordance with the present invention, comprises drawing the map image responsive to a predetermined scaling factor, drawing an image of the facility mark corresponding to the specific facility in a display pattern responsive to said scaling factor, and displaying the image of said facility mark, superimposed on said map image. According to the method of the present invention, the image of the facility mark is drawn in the display pattern responsive to the scaling factor of the map image, making it possible to improve the visibility of the map image including the facility information.

BRIEF DESCRIPTION OF SEVERAL VIEWS OF THE DRAWINGS

FIG. 9 is a diagram showing the contents of main or big genres.

DESCRIPTION OF THE PREFERRED EMBODIMENTS

A navigation device according to one preferred embodiment of the present invention will be described in detail hereinafter with reference to the drawings.

Figure 1:
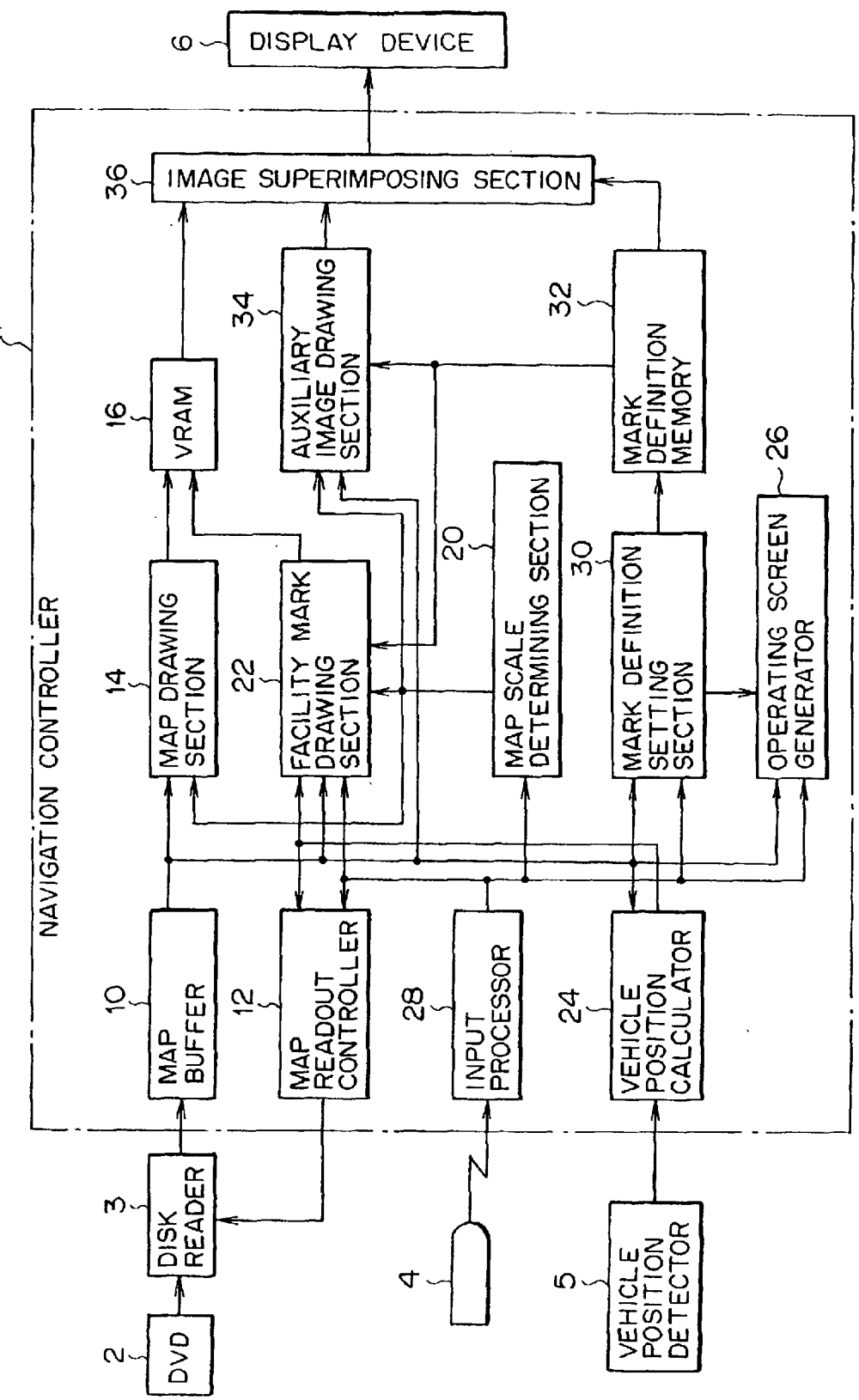
FIG. 1 is a block diagram of one preferred embodiment of a navigation device in accordance with the present invention.

FIG. 1 is a block diagram showing the configuration of the navigation device of the embodiment. Referring to FIG. 1, the navigation device includes a navigation controller 1, a DVD 2, a disk reader 3, a remote control unit 4, a vehicle position detector 5, and a display device 6.

The navigation controller 1 controls the entire operation of the navigation device. The navigation controller 1 performs its function by running a predetermined operating program through the use of CPU, ROM, RAM and the like. The detailed structure of the navigation controller 1 will be described later.

The DVD 2 is an information recording medium that stores map data necessary for a map display, a route search and the like. The map data stored in the DVD 2 includes detailed facility data in which the information regarding various facilities is stored.

The disk reader 3 is capable of holding one or more sheets of the DVDs 2 and reads the map data out of any one of the DVDs 2 under the control of the navigation controller 1. A disk to be held is not necessarily a DVD, but may be a CD. The disk reader 3 may selectively hold a DVD or a CD.

The remote control unit 4 has various kinds of operating keys such as a joy stick for designating the vertical and lateral directions, a ten-digit keypad, and a determining key for determining various settings. The remote control unit 4 transmits a signal to the navigation controller 1 according to an operating instruction provided by the operating keys.

The vehicle position detector 5 includes, for example, a satellite global positioning system (GPS) receiver, an angle sensor, a distance sensor and the like. The vehicle position detector 5 detects the present position of a vehicle (longitude, latitude) at a predetermined timing to provide a detected result.

The display device 6 displays various types of images such as a map image covering the present vehicle position and its surroundings, and an image of the traveling route, based on drawing data provided by the navigation controller 1.

Next, the detailed structure of the navigation controller 1 will be described hereinafter. As shown in FIG. 1, the navigation controller 1 includes a map buffer 10, a map readout controller 12, a map drawing section 14, a video RAM (VRAM) 16, a map scale determining section 20, a facility mark drawing section 22, a vehicle position calculator 24, an operating screen generator 26, an input processor 28, a mark definition setting section 30, a mark definition memory 32, an auxiliary image drawing section 34, and an image superimposing section 36.

The map buffer 10 temporarily stores map image data read out of the DVD 2 by the disk reader 3.

The map readout controller 12 issues a request to the disk reader 3 for the readout of the map data having a predetermined display range, in accordance with the present vehicle position calculated by the vehicle position calculator 24 and a request from the input processor 28 or the like.

The map drawing section 14 generates map drawing data for the display of the map image, based on the map data stored in the map buffer 10. The VRAM 16 temporarily stores the map drawing data generated by the map drawing section 14.

The map scale determining section 20 determines a value of a scaling factor (reduced scale) of the map image set by the user's operation of the remote control unit 4, based on a signal provided by the input processor 28. In the present embodiment, the value of the scaling factor of the map image can be determined as desired in a range from "1/20,000,000" (the so-called "200 km scale"), by which the 1 cm size on the map corresponds to the 200 km size in a real-world situation, to the scaling factor of "1/1000" (the so-called "10 m scale"), by which the 1 cm size on the map corresponds to the 10 m size in the real-world situation. Thus, the map scale determining section 20 determines the value of the scaling factor set by the user's operation of the remote control unit 4.

The facility mark drawing section 22 generates drawing data for the display of the facility marks indicating the locations of various facilities on the map image, and stores it in the VRAM 16. The facility mark drawing section 22 of the embodiment draws the facility mark with its display pattern changed according to the scaling factor of the map image determined by the map scale determining section 20. The specific display patterns of the facility marks will be explained in detail later.

The vehicle position calculator 24 calculates the present vehicle position and the traveling direction of the vehicle based on the detected data provided by the vehicle position detector 5, while performing a map-matching processing to adjust the vehicle position when the calculated vehicle position is off of the road on the map data.

The operating screen generator 26 generates drawing data for the display of various operating screens according to an instruction from the input processor 28.

The input processor 28 supplies the instruction to perform the operations corresponding to the respective operation instructions provided by the remote control unit 4 to each section in the navigation controller 1.

When the facility mark drawing section 22 draws the facility mark with its display pattern changed according to the scaling factor of the map image, the mark definition setting section 30 sets the relationship between the changed facility mark, that is, the facility mark having the changed display mark, and the genre of the facility corresponding thereto. This relationship will be described in detail later. The mark definition memory 32 stores the content set by the mark definition setting section 30.

In a case where the facility mark having the changed display pattern is drawn in a predetermined dot image (which will be described in detail later), the auxiliary image drawing section 34 draws a predetermined auxiliary image indicating the relationship between the dot image and the genre of the facility corresponding thereto. The example of the auxiliary image will also be described later. Further, in a case where the relationship between the changed display mark and the genre of the facility is set as desired by the user and the set relationship is stored in the mark definition memory 32, the auxiliary image drawing section 34 draws the auxiliary image according to the set relationship.

The image superimposing section 36 merges the drawing data read out of the VRAM 16, the drawing data supplied by the operating screen generator 26, and the drawing data supplied by the auxiliary image drawing section 34 to provide the merged drawing data to the display device 6.

The above-mentioned map drawing section 14 corresponds to a "map drawing section"; the facility mark drawing section 22 to a "facility mark drawing section"; the display device 6, the VRAM 16, and the image superimposing section 36 to a "display processor"; the remote control unit 4 to a "dot designating section"; the input processor 28 to a "collective-facility-mark designating section"; the map drawing section 14 to a "first detailed information drawing section"; and the facility mark drawing section 22 to a "second detailed information drawing section." Further, the mark definition setting section 30 corresponds to a "dot definition section"; the mark definition memory 32 to a "collective-facility-mark definition section"; and the auxiliary image drawing section 34 to a "auxiliary image drawing section".

Next, the operation of the navigation device of the embodiment having the above-mentioned configuration will be described.

Figure 2:
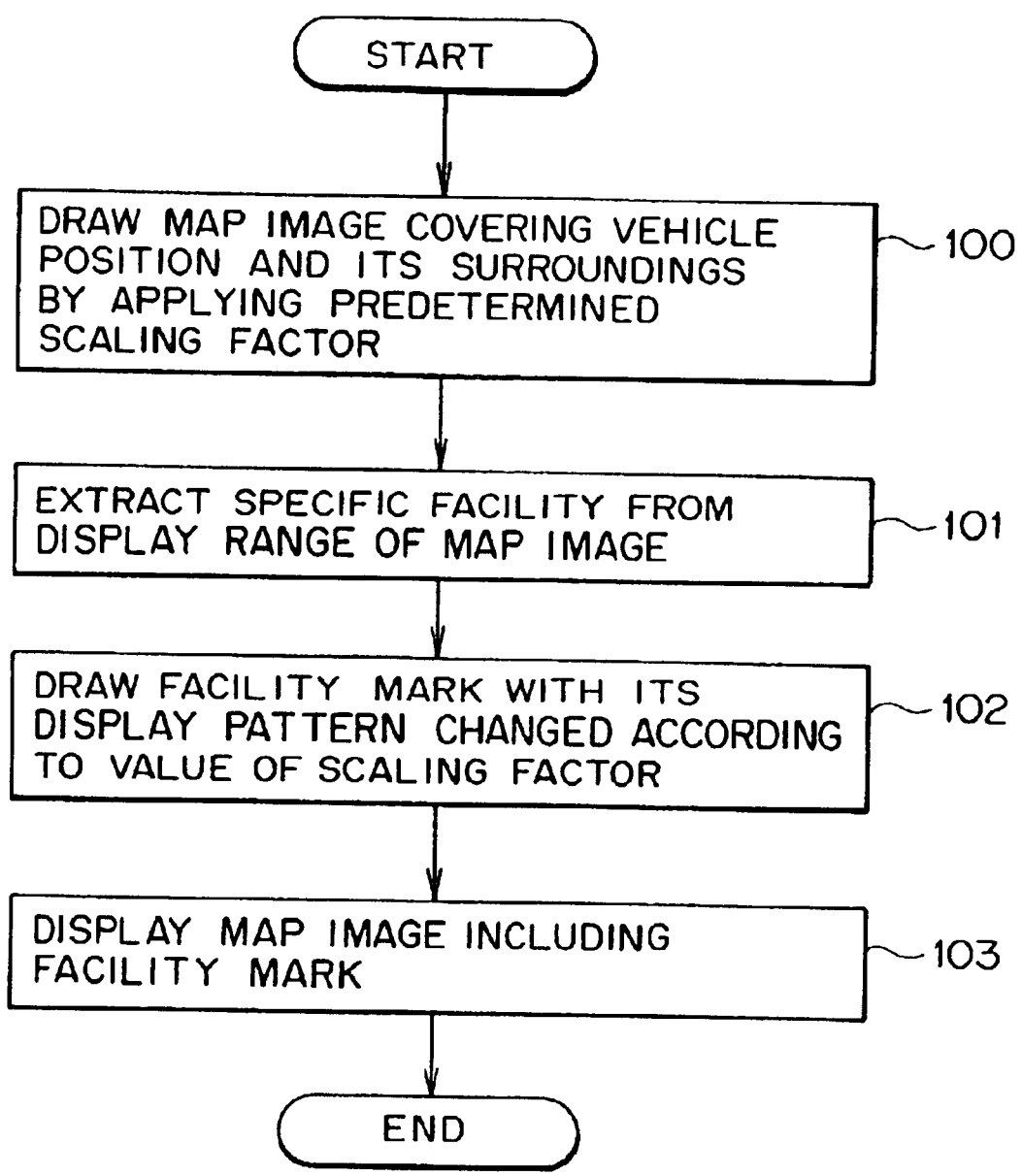
FIG. 2 is a flow chart showing the operation of the navigation device upon displaying a map image including facility marks in accordance with the present invention.

FIG. 2 is a schematic flow chart showing the operation of the navigation device upon displaying a map image including the facility marks.

The map drawing section 14 obtains the determined value of the scaling factor of the map image from the map scale determining section 20, and generates the map drawing data for the display of the map image covering the vehicle position and its surroundings in accordance with the value of the scaling factor, and stores it in the VRAM 16 (step 100).

The facility mark drawing section 22 extracts the specific facility, that is, the facility to be displayed as the facility mark from a display range of the map image, using the map data stored in the map buffer 10 (step 101).

Next, the facility mark drawing section 22 obtains the determined value of the scaling factor of the map image from the map scale determining section 20, and generates the drawing data for the display of the facility mark having its display pattern changed according to the scaling factor's value, and stores it in the VRAM 16 (step 102).

To be more specific, the facility mark drawing section 22 of the embodiment draws the facility marks in different ways depending on the following exemplary cases (1) to (4). Suppose the scaling factor (reduced scale) is referred to as a, the case (1) is $\alpha > 1/20000$ (namely, greater than the so-called "200 m scale"); the case (2) is $1/20000 \geq \alpha > 1/40000$ (namely, the so-called "200 m scale" and "400 m scale"); the case (3) is $1/40000 \geq \alpha > 1/80000$ (namely, the so-called "400 m scale" and "800 m scale"); and the case (4) is $1/80000 \geq \alpha$ (namely, the so-called "800 m scale" or less). The detailed processing in each of the above cases (1) to (4) will be described later.

The image superimposing section 36 merges the drawing data stored in the VRAM 16, and the drawing data supplied by the auxiliary image drawing section 34 or the like to provide the merged drawing data to the display device 6. That is, the map image including the facility marks and the like is displayed on the screen of the display device 6, based on the drawing data provided from the image superimposing section 36 (step 103).

Next, the processing in step 102 will be described in more detail according to the set value of the scaling factor $\alpha$.

(a) The case of "$\alpha > 1/20000$" (the above-mentioned case (1))

Figure 3:
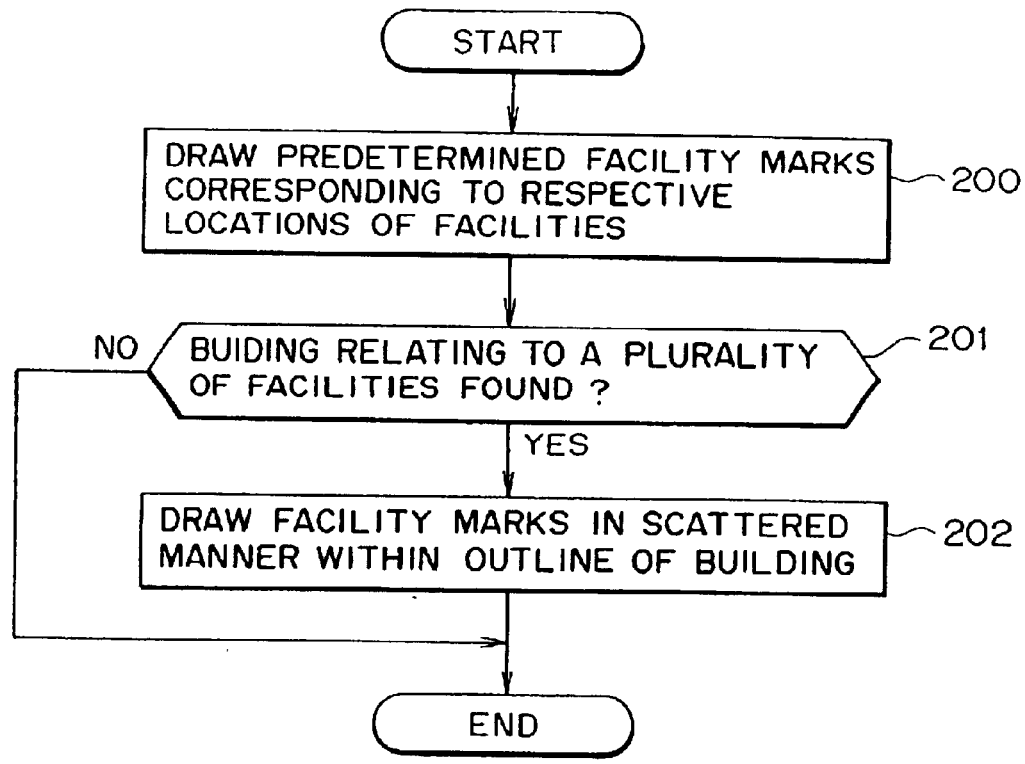
FIG. 3 is a flow chart showing the operation of drawing the facility mark in a case where the value of scaling factor α is greater than 1/20000.

FIG. 3 is a flow chart showing the drawing operation of the facility mark in a case where the value of the scaling factor $\alpha$ (reduced scale) is greater than 1/20000. In this case, the value of the scaling factor "1/20000" corresponds to "the third value."

The facility mark drawing section 22 generates the drawing data for the display of the predetermined facility marks corresponding to respective locations of the facilities which have been extracted in the above step 101 (step 200). In step 200, in a case where the facility of interest is a franchised store, the facility mark used is a trademark that is commonly used by the same kind of franchised stores.

Further, in parallel with step 200, the facility mark drawing section 22 determines whether or not there is a building relating to a plurality of facility marks (step 201). In a case where there is a building relating to the plurality of facility marks, an affirmative determination is made in step 201, and the facility mark drawing section 22 generates the drawing data of the facility marks so as to arrange the plurality of facility marks in a scattered manner within the outline of the building on the map image (step 202). If there is no building relating to the plurality of facility marks, a negative determination is made in step 201, and in this case the processing in step 202 is omitted.

Figure 4:
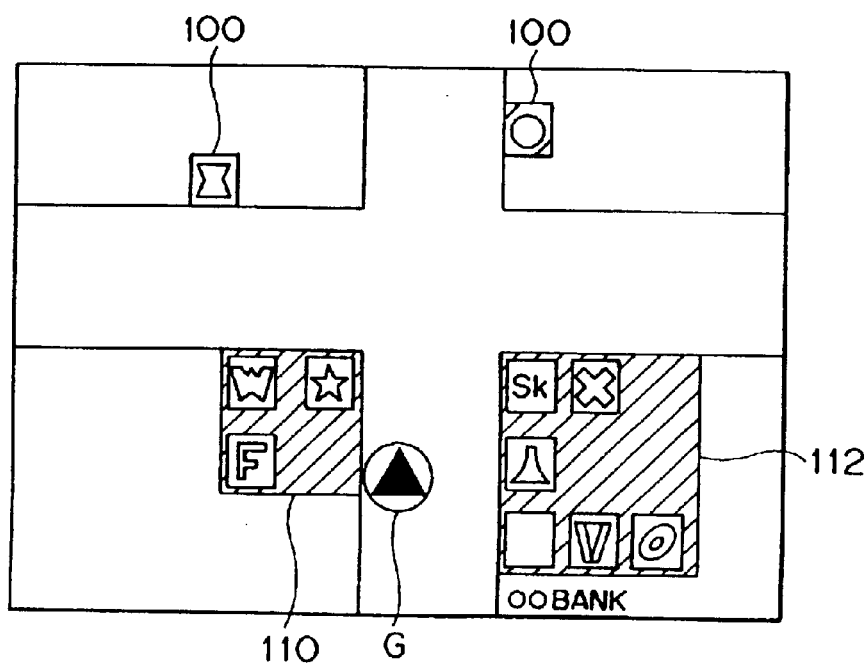
FIG. 4 is a diagram showing an example of the display of facility marks in a case where the value of the scaling factor α is greater than 1/20000.

FIG. 4 is a diagram showing an example of the display of the facility marks in a case where the value of the scaling factor α is greater than 1/20000. This figure shows the map image covering the present vehicle position and its surroundings with the present vehicle position designated as a vehicle position mark G. On the upper half of the screen, there are provided two facility marks 100, to thereby indicate the locations of facilities such as convenience stores. On the lower half of the screen, there are provided a building 110 and a building 112, each of which relates to a plurality of facility marks. The building 110 relates to three facility marks. These three facility marks are arranged within the outline of the building 110 in the scattered manner. Similarly, the building 112 relates to six facility marks. These six facility marks are arranged within the outline of the building 112 in the scattered manner. Thus, the facility marks are drawn within the outline of the building in the scattered manner, to thereby facilitate understanding that the facilities are within the buildings.

(b) The case of "1/20000≧α>1/40000" (the above-mentioned case (2))

Figure 5:
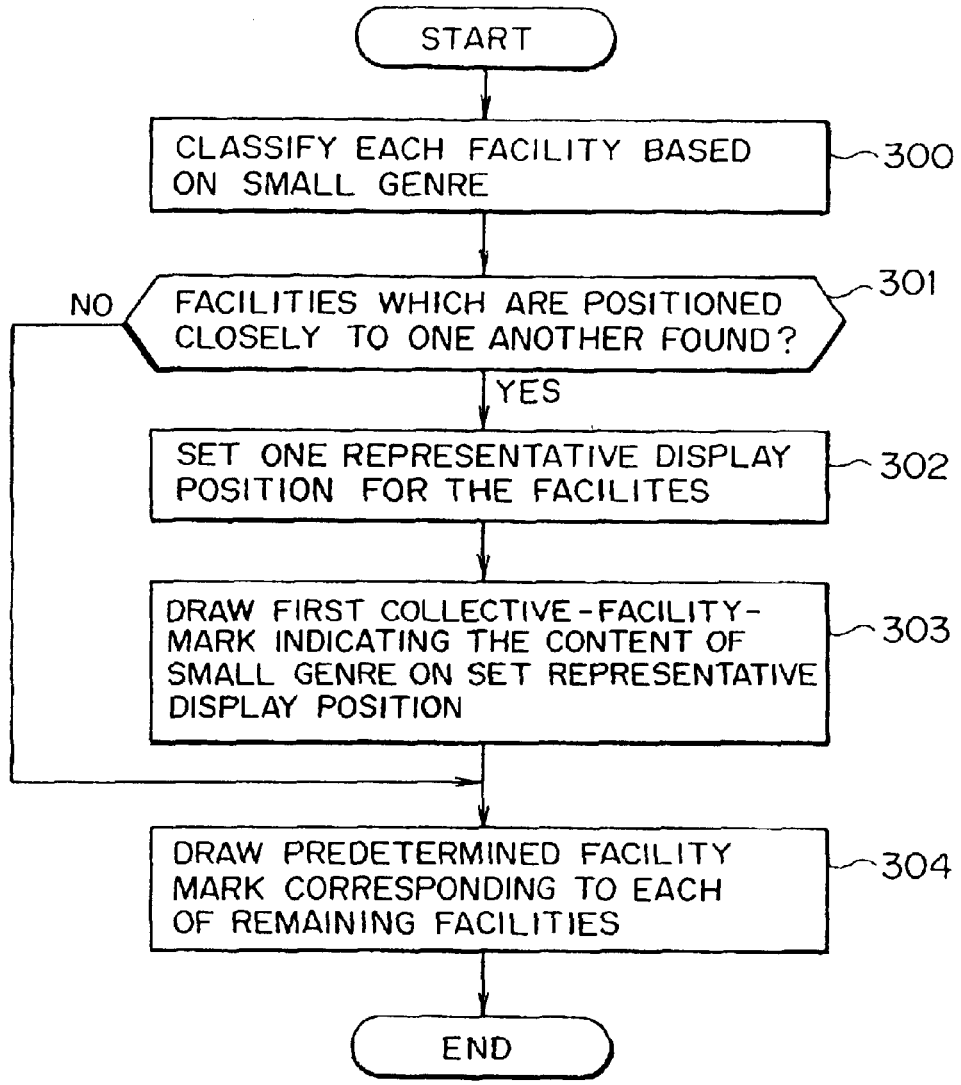
FIG. 5 is a flow chart showing the operation of drawing the facility mark in a case where the value of the scaling factor α is 1/20000 or less, and greater than 1/40000.

FIG. 5 is a flow chart showing the drawing operation of the facility mark in a case where the value of the scaling factor α (reduced scale) is 1/20000 or less, and greater than 1/40000. In this case, the value of the scaling factor "1/20000" corresponds to "the third value," and the value of the display factor "1/40000" corresponds to "the second value."

The facility mark drawing section 22 classifies each facility extracted in the above-mentioned step 101, based on a small genre (step 300). The small genre indicates the service or detailed kind of each facility. For instance, the small genre in the present embodiment is the detailed classification of the facility based on its services, such as a convenience store, a department store, a gas station, a family restaurant, and a fast food restaurant.

Next, the facility mark drawing section 22 determines whether or not there are any facility marks belonging to the same small genre and positioned close to one another (step 301). In a case where there are some facility marks which are positioned close to one another, an affirmative determination is made in step 301, and the facility mark drawing section 22 integrates these facility marks to set one display position (representative display position) (step 302).

Then, the facility mark drawing section 22 generates the drawing data for displaying on the above-mentioned representative display position a predetermined facility mark (hereunder, referred to as "the first collective-facility-mark") indicating the content of the small genre, to which the plurality of facilities integrated in the above step 302 commonly belong (step 303).

Figure 6:
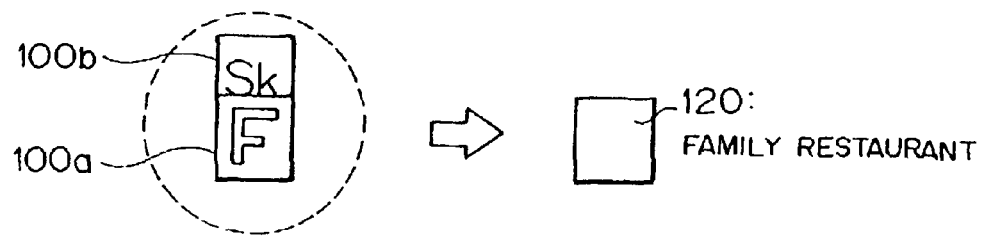
FIG. 6 is a diagram showing the image processing in step 302 and step 303.

FIG. 6 is a diagram showing the image processing in step 302 and step 303.

The facility mark drawing section 22 selects, for example, one facility mark in order of increasing distance from the present vehicle position, and checks whether or not there are any other facility marks which are positioned close to the selected facility mark. In the example as shown in FIG. 6, the facility mark 100*a* is selected as the facility mark close to the present vehicle position, and the facility mark 100*b* is extracted as another facility mark positioned within the predetermined display range (in this figure, the range enclosed by a dotted line) from the facility mark 100*a*, that is, as another facility mark positioned near the facility mark 100*a*. In this case, the facility mark drawing section 22 sets the location of the facility mark 100*a*, which is close to the present vehicle position, as the representative display position of the two facility marks 100*a* and 100*b*.

Then, the facility mark drawing section 22 draws the first collective-facility-mark indicating the content of the small genre to which the two facility marks belong, on the representative display position. In the example as shown in FIG. 6, the two facility marks 100*a* and 100*b* designate family restaurants, such that there are provided on the representative display position the drawing of the first collective-facility-mark 120 indicating "family restaurant", which is the small genre that the two facility marks commonly belong to.

In a case where there are three or more facility marks which are positioned close to one another, one representative display position is set and the first collective-facility-mark is drawn in the same way as in the above-mentioned process.

After the predetermined collective-facility-mark is drawn, or when in the above step 301 a negative determination is made because there are no facility marks positioned close to one another, the facility mark drawing section 22 generates the drawing data for the display of the predetermined facility marks corresponding to the remaining facilities on the respective locations of the remaining facilities (step 304). In step 304, when the facility to be displayed is a franchised store, the facility mark used is a trademark that is commonly used by the same kind of the franchised stores.

Figure 7:
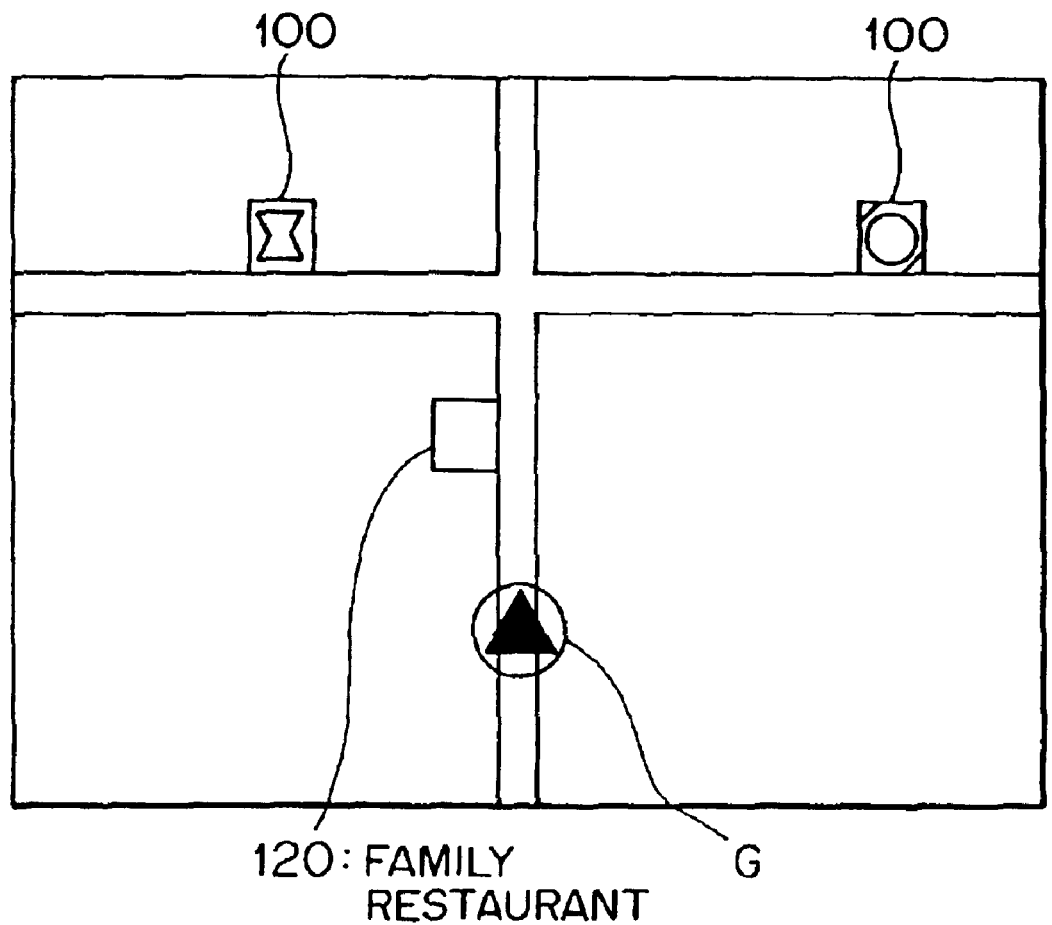
FIG. 7 is a diagram showing an example of the display of facility marks in a case where the value of the scaling factor α is 1/20000 or less, and greater than 1/40000.

FIG. 7 is a diagram showing an example of the display of the facility marks in a case where the value of the scaling factor α is 1/20000 or less, and greater than 1/40000. This figure shows the map image covering the present vehicle position and its surroundings, with the present vehicle position designated as a vehicle position mark G. On the upper half of the screen, there are provided two facility marks 100, the locations of facilities such as convenience stores. In the center of the screen, there is provided a first collective-facility-mark 120 into which a plurality of facility marks close to each other are integrated; some facilities belonging to the small genre "family restaurant" are located at this spot. Thus, the plurality of facility marks belonging to the same small genre are integrated into the one first collective-facility-mark, which is displayed instead of these facility marks. As a result, the number of the facility marks to be displayed can be decreased. Further, it facilitates understanding of the locations of the facilities belonging to the desired small genre, thus improving the visibility of the map image including the facility information.

(c) The case of "1/40000≧α>1/80000" (the above-mentioned case (3))

Figure 8:
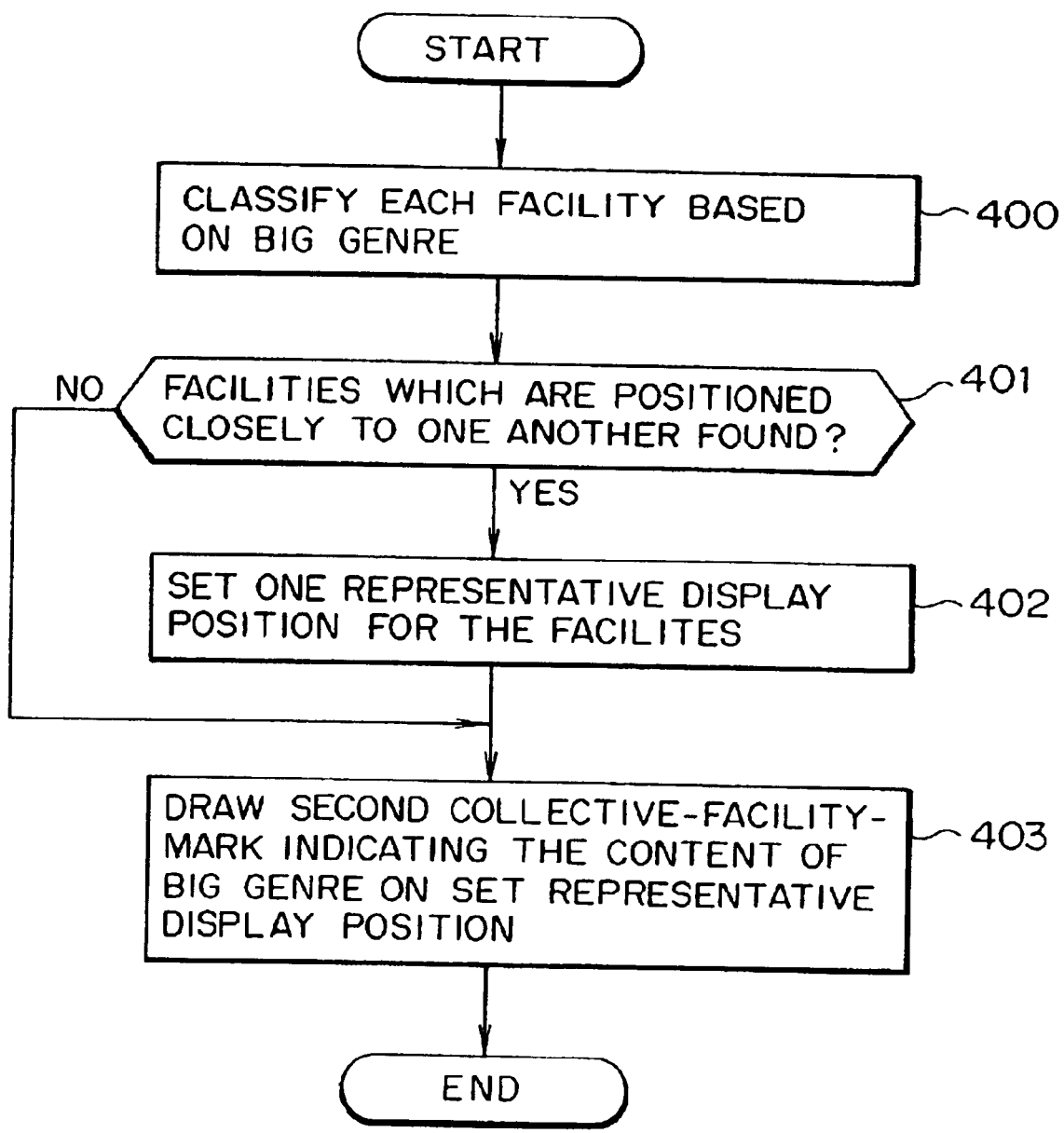
FIG. 8 is a flow chart showing the operation of drawing the facility mark in a case where the value of the scaling factor α is 1/40000 or less, and greater than 1/80000.

FIG. 8 is a flow chart showing the operation of drawing the facility mark in a case where the value of the scaling factor α (reduced scale) is 1/40000 or less, and greater than 1/80000. In this case, the value of the scaling factor "1/40000" corresponds to "the second value."

The facility mark drawing section 22 classifies a facility extracted in the above-mentioned step 101, based on a predetermined big genre (step 400).

FIG. 9 is a diagram showing the contents of the big genres as described above. The big genres of the present embodiment schematically designate the service of the respective facilities. For instance, three big genres "food service facility," "automotive service facility" and "other stores" are shown in FIG. 9.

The big genre "food service facility" is a schematic classification of the facility types in terms of dining out. The small genres such as the family restaurant, the fast food restaurant, the Chinese restaurant, and the Japanese restaurant, belong to this big genre "food service facility." The big genre "automotive service facility" is a schematic classification of the facility types relating to vehicles. The small genres such as the gas station, the automotive supply shop, and the car dealer, belong to this big genre "automotive service facility." The big genre "other stores" is a schematic classification of the facility types in terms of various stores excluding the above two big genres. The small genres such as the convenience store, the drugstore, the bookstore and the department store belong to this big genre "other stores." In the above-mentioned step 400, the facilities are classified based on these big genres.

Next, the facility mark drawing section 22 determines whether or not there are the facility marks belonging to the same big genre and positioned close to one another on the screen (step 401).

In a case where there are the facility marks positioned close, affirmative determination is made in step 401, and the facility mark drawing section 22 integrates these facility marks to set one representative display position for the facilities (step 402). If there are no facility marks positioned close to one another, a negative determination is made in step 401, and the processing in step 402 is omitted.

Next, the facility mark drawing section 22 generates the drawing data for displaying a predetermined facility mark (hereunder, referred to as "the second collective-facility-mark") indicating the content of the big genre to which a plurality of facilities commonly belong, on the representative display position set in step 402 and at the display positions of remaining facility marks (step 403).

Figure 10:
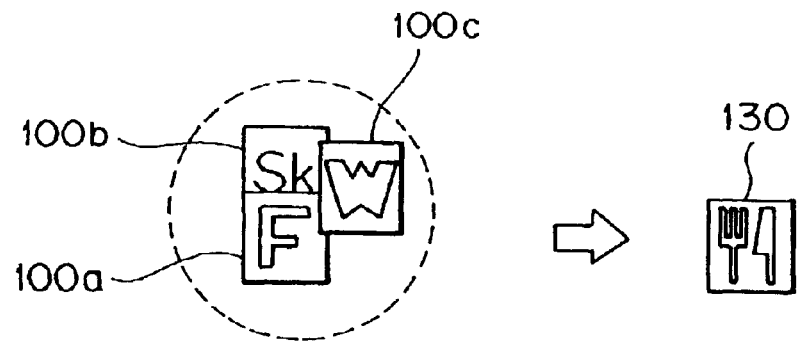
FIG. 10 is a diagram showing the image processing in step 402 and step 403.

FIG. 10 is a diagram showing the image processing in step 402 and step 403.

The facility mark drawing section 22 selects, for example, one facility mark in order of increasing distance from the present vehicle position, and checks whether or not there are any facility marks which are positioned close to the selected facility mark. In the example shown in FIG. 10, the facility mark 100a is selected as the facility mark close to the present vehicle position, and the facility marks 100b and 100c are extracted as other facility marks positioned within a predetermined display range (in this figure, the range enclosed by a dotted line) from the facility mark 100a, that is, as other facility marks positioned near the facility mark 100a. In this case, the facility mark drawing section 22 sets the location of the facility mark 100a, which is close to the present vehicle position, as the representative display position of the three facility marks 100a, 100b and 100c.

Then, the facility mark drawing section 22 draws the second collective-facility-mark indicating the content of the big genre to which the three facility marks belong, on the representative display position. In the example shown in FIG. 10, the two facility marks 100a and 100b belong to the small genre "family restaurant", and the facility mark 100c belongs to the small genre "fast food restaurant". Accordingly, the second collective-facility-mark 130 indicating the big genre "food service facility" to which these facilities commonly belong is drawn on the representative display position.

FIG. 10 shows the case where the three facility marks are positioned close to one another. In a case where there are at least two facility marks positioned close to one another, the one representative display position is set and the second collective-facility-mark is drawn in the same way as the above-mentioned process.

Figure 11:
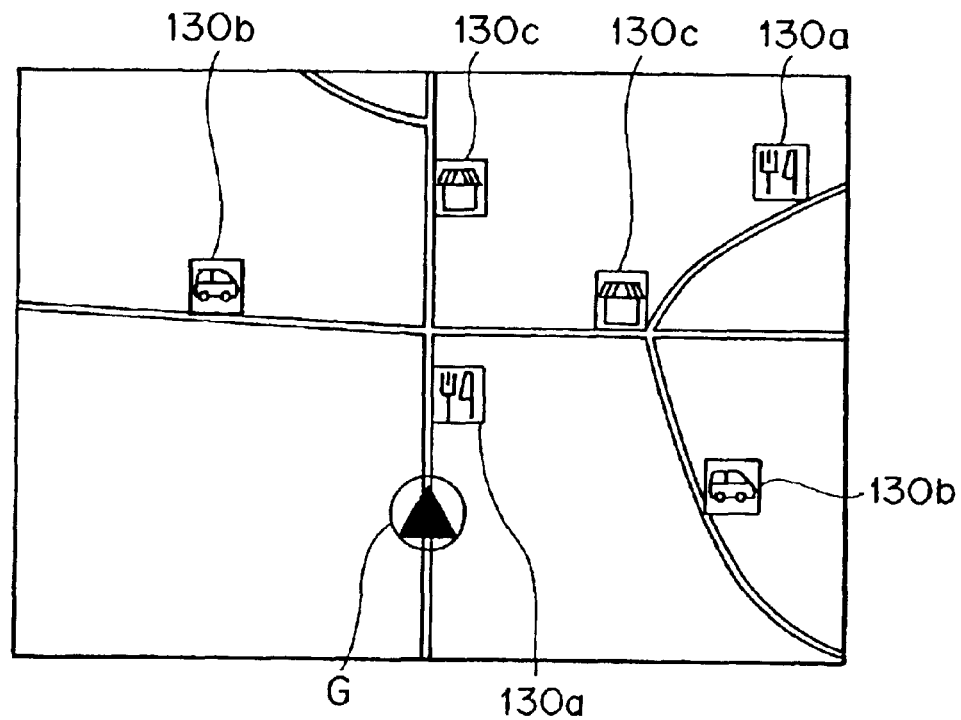
FIG. 11 is a diagram showing an example of the display of facility marks in a case where the value of the scaling factor α is 1/40000 or less, and greater than 1/80000.

FIG. 11 is a diagram showing an example of the display of facility marks in a case where the value of the scaling factor $\alpha$ is 1/40000 or less, and greater than 1/80000. This figure shows the map image covering the present vehicle position and its surroundings, with the present vehicle position designated as a vehicle position mark G. The two second collective-facility-marks 130a on the right side of the screen and in the center thereof designate the locations of facilities that belong to the big genre "food service facility". Similarly, the two second collective-facility-marks 130b on the left side toward the center of the screen and on the lower right side thereof designate the locations of facilities that belong to the big genre "automotive service facility". Similarly, the two second collective-facility-marks 130c on the right side toward the center of the screen and on the upper side toward the center thereof designate the locations of facilities that belong to the big genre "other stores". Thus, a plurality of facility marks belonging to the same big genre are integrated into one second collective-facility-mark, which is drawn on the screen, thereby decreasing the number of facility marks to be displayed, to improve the visibility of the map image including the facility information.

(d) The case of "$1/80000 \geq \alpha$" (the above-mentioned case (4))

Figure 12:
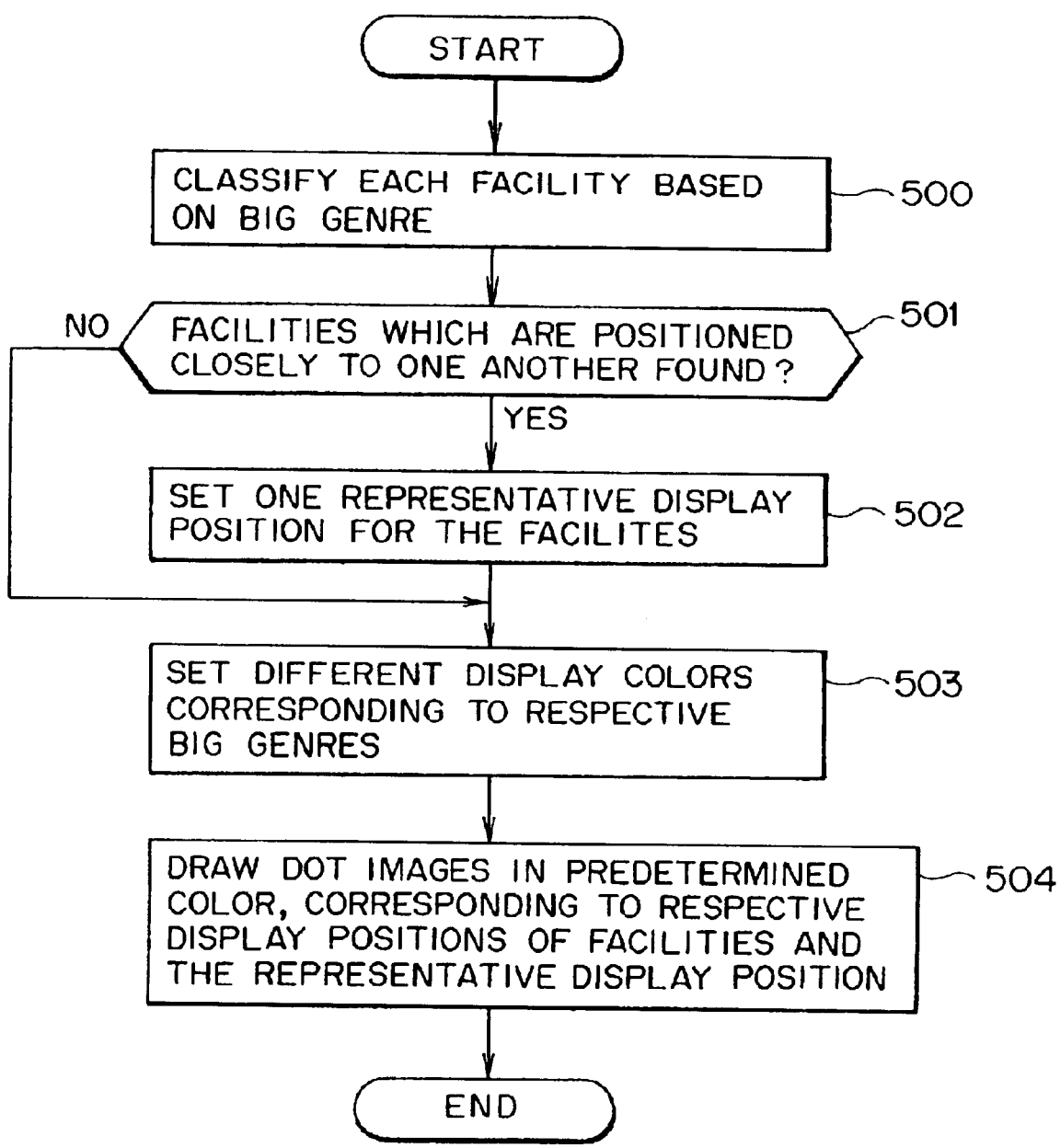
FIG. 12 is a flow chart showing the operation of the drawing facility mark in a case where the value of the scaling factor α is 1/80000 or less.

FIG. 12 is a flow chart showing the operation of drawing the facility mark in a case where the value of the scaling factGor $\alpha$ (reduced scale) is 1/80000 or less. In this case, the value of the scaling factor "1/80000" corresponds to "the first value."

The facility mark drawing section 22 classifies each facility extracted in the above-mentioned step 101, based on the predetermined big genre (see FIG. 9) (step 500). Next, the facility mark drawing section 22 determines whether or not there are facility marks belonging to the same big genre that are positioned close to one another on the screen (step 501).

In a case where there are facility marks that are positioned close to one another, an affirmative determination is made in the step 501, and the facility mark drawing section 22 integrates these facility marks to set one representative display position for the facilities (step 502). The processing in step 502 is the same as that in the above-mentioned step 402 as shown in FIG. 8. Accordingly, the detailed explanation of step 502 will be omitted from the following.

If there are no facility marks that are positioned close to one another, a negative determination is made in step 501, and in this case the processing in step 502 is omitted.

Next, the facility mark drawing section 22 sets different display colors corresponding to the respective big genres as the colors in which the facility marks are drawn (step 503). For instance, the big genre "food service facility" is assigned a blue color, the big genre "automotive service facility" a green color, and the big genre "other stores" a red color. Thus, the big genres are assigned different colors, respectively.

Then, the facility mark drawing section 22 generates the drawing data for the display of a dot image as the third collective-facility-mark in a predetermined color set according to the content of the big genre, on the representative display position set in step 502 and at the respective display positions of the remaining facility marks (step 504).

Figure 13:
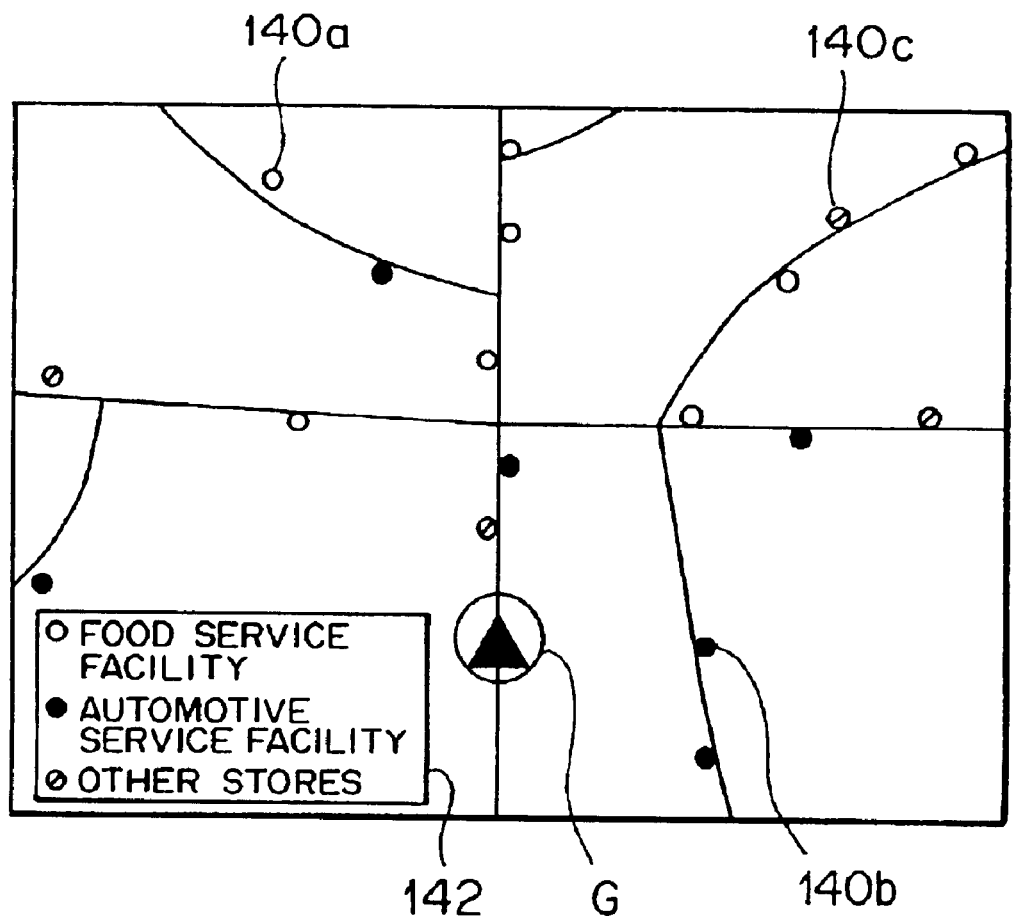
FIG. 13 is a diagram showing an example of the display of facility marks in a case where the value of the scaling factor α is 1/80000 or less.

FIG. 13 is a diagram showing an example of the display of facility marks in a case where the value of the scaling factor $\alpha$ is 1/80000 or less. This figure shows the map image covering the present vehicle position and its surroundings, with the present vehicle position designated as a vehicle position mark G. On the various positions of the screen, there are provided a plurality of dot images in the predetermined colors of the third collective-facility-marks, to show the locations of the facilities. For instance, the third collective-facility-marks 140a described as white circles designate the locations of the facilities that belong to the big genre "food service facility." The third collective-facility-marks 140b described as black circles designate the locations of the facilities that belong to the big genre "automotive service facility." Similarly, the third collective-facility-mark 140c described as white circles each of which includes a slash mark, designate the locations of the facilities that belong to the big genre "other stores." It is to be noted that for the sake of convenience, the above-mentioned white circles in FIG. 13 correspond to the spots in a blue color on the screen; the black circles correspond to the spots in a green color; and the white circles including the slash marks correspond to the spots in a red color.

As described above, when the value of the scaling factor is relatively small and there are a large number of facilities to be displayed as facility marks within the display range of the map image, the facilities are classified by the big genres and the facilities belonging to the same big genre are displayed as one third collective-facility-mark by a dot image. Accordingly, the ratio of the areas occupied by the facility marks to the entire area of the map image can be reduced to a relatively low value, making it possible to prevent degradation in the visibility of the map image.

In addition, as shown in FIG. 13, an auxiliary image 142 indicating the relationship between the display color of a third collective-facility-mark and the big genre is displayed on the lower left side of the screen by the auxiliary image drawing section 34, to thereby understand easily what kind of facility corresponds to a dot image in a particular display color. In the example of FIG. 13, the third collective-facility-marks are given different display colors according to the contents of the big genres corresponding to the respective third collective-facility-marks, to thereby distinguish them. However, other means such as means for changing the shape of the dot image (for example, means for changing a round shaped dot image into a triangular one, or a rectangular one) may be applied to the present invention, so as to make the collective-facility-marks distinguishable.

In addition, when the facility mark is displayed with its display pattern changed in response to the value of the scaling factor of the map image according to the above-mentioned processes, there may be displayed a list (corresponding to the information image) indicating the kinds of facility marks integrated into a designated collective-facility-mark. By the list, it is possible to know the detailed information on the facilities.

Figure 14:
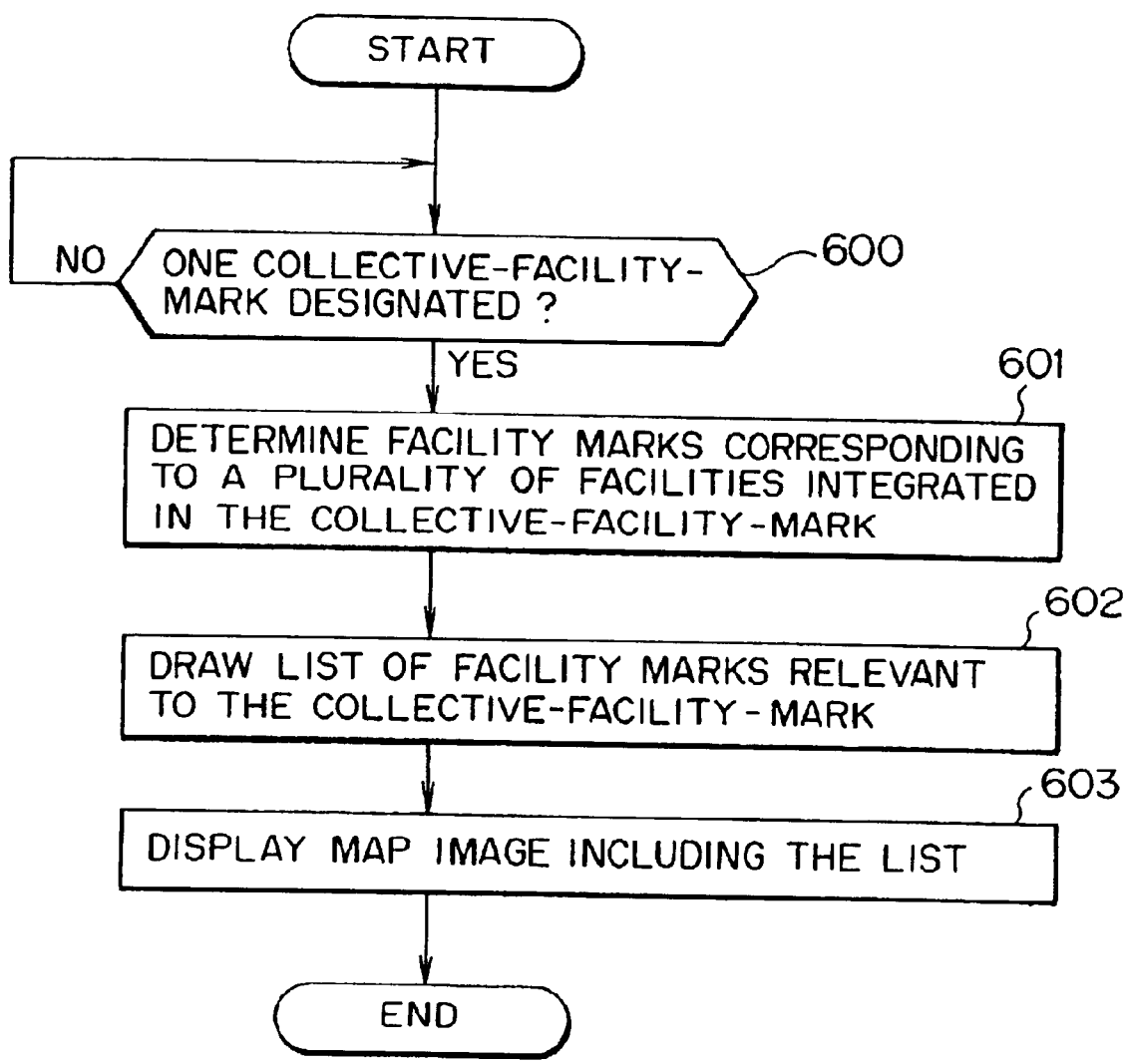
FIG. 14 is a flow chart showing the operation of the navigation device according to the present invention in the case of designating one collective-facility-mark and displaying a list of a plurality of facility marks integrated into the designated collective-facility-mark.

FIG. 14 is a flow chart showing the operation of the navigation device according to the present invention in the case of designating one collective-facility-mark and displaying the list of the plurality of facility marks integrated into the designated collective-facility-mark. The designated collective-facility-mark may be any one of the above-mentioned first, second and third collective-facility-marks. Hereinafter, the first, second and third collective-facility-marks are generically called simply a "collective-facility-mark".

The input processor 28 determines whether or not any one of the collective-facility-marks on the map image is designated by the user's operation of the remote control unit 4 (step 600). More specifically, the user can designate one collective-facility-mark by moving the cursor mark on the screen to the display position of the desired collective-facility-mark by use of the remote control unit 4. If no collective-facility-mark is designated, step 600 is repeatedly performed.

One collective-facility-mark may be designated by pushing a specific key (for example, the so-called "nearby key" and the like) included in the remote control unit 4. In this case, when the specific key such as the nearby key is pushed, the collective-facility-mark is designated which is displayed nearest to the present vehicle position or to the cursor's position. Such a specific key enhances the operability of the navigation device.

After a collective-facility-mark is designated by the remote control unit 4, an affirmative determination is made in the step 600. The facility mark drawing section 22 determines a plurality of facility marks integrated into the designated collective-facility-mark (step 601) and then draws a predetermined list (described in detail later) indicating the genres or kinds of the determined facility marks, relevant to the one collective-facility-mark (step 602).

The image superimposing section 36 reads out the drawing data stored in the VRAM 16 to provide it to the display device 6. Based on the drawing data provided by the image superimposing section 36, the map image including the list of the facility marks is displayed on the screen of the display device 6 (step 603).

Figure 15:
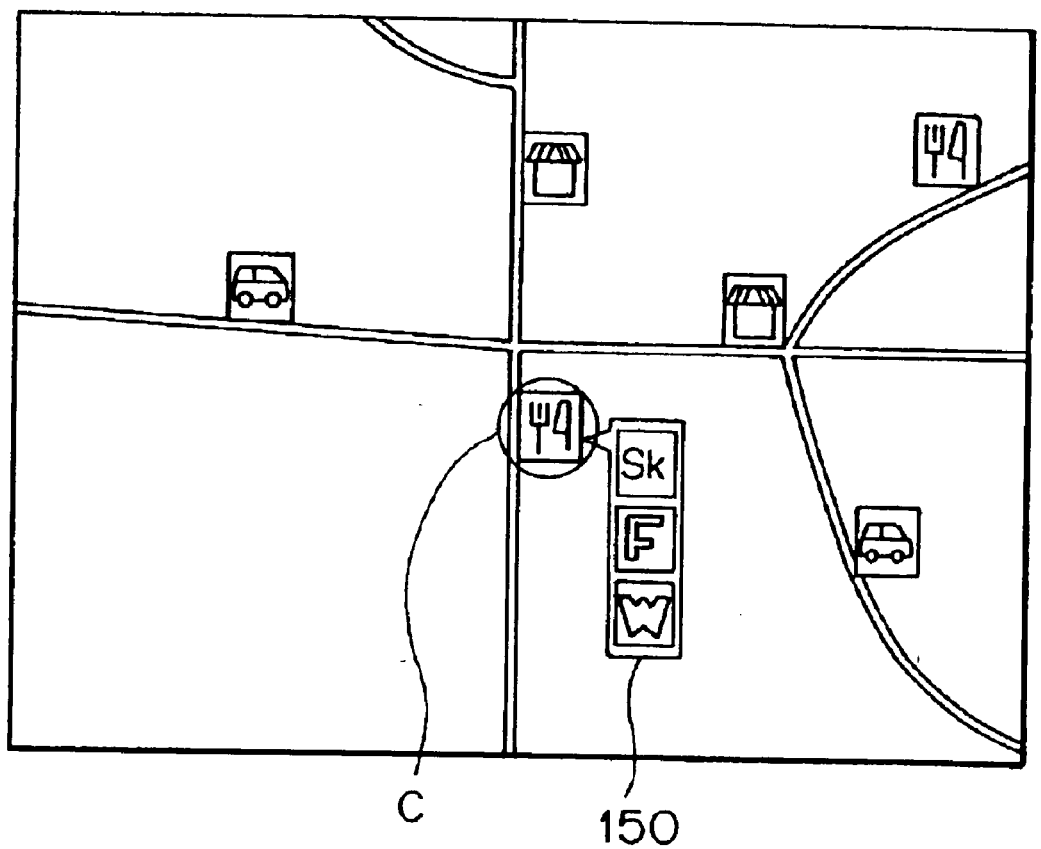
FIG. 15 is a diagram showing an example of the display of the facility mark's list.

FIG. 15 is a diagram showing an example of the display of the facility mark's list. As one example, FIG. 15 shows that the second collective-facility-marks are displayed on the map image and that one of the second collective-facility-marks is designated. As shown in FIG. 15, by moving the cursor mark C to the desired position, or by pressing the nearby key, one second collective-facility-mark is designated, and a corresponding list 150 is displayed indicating the kinds of three facility marks that are integrated into the second collective-facility-mark. The display of the list 150 facilitates an understanding of the kinds of facility marks integrated into the second collective-facility-mark.

FIG. 15 shows an example in the case where one second collective-facility-mark is designated on the map image when the value of the scaling factor $\alpha$ is 1/40000 or less and greater than 1/80000 ($1/40000 \geq \alpha > 1/80000$). The map image may be displayed by another value of the scaling factor, and the above-mentioned first or third collective-facility-mark may be designated to be listed.

Further, in the case of displaying the facility mark with its display pattern changed according to the value of the scaling factor of the map image as described above, one collective-facility-mark superimposed on the wide-range map image (for example, the map image displayed under the following condition "$1/20000 \geq \alpha$") is designated. There is provided a detailed area map image, which corresponds to the information image, covering a spot corresponding to the designated collective-facility-mark and its surroundings, thereby facilitating an understanding of the genres or kinds of facility marks integrated into the collective-facility-mark.

Figure 16:
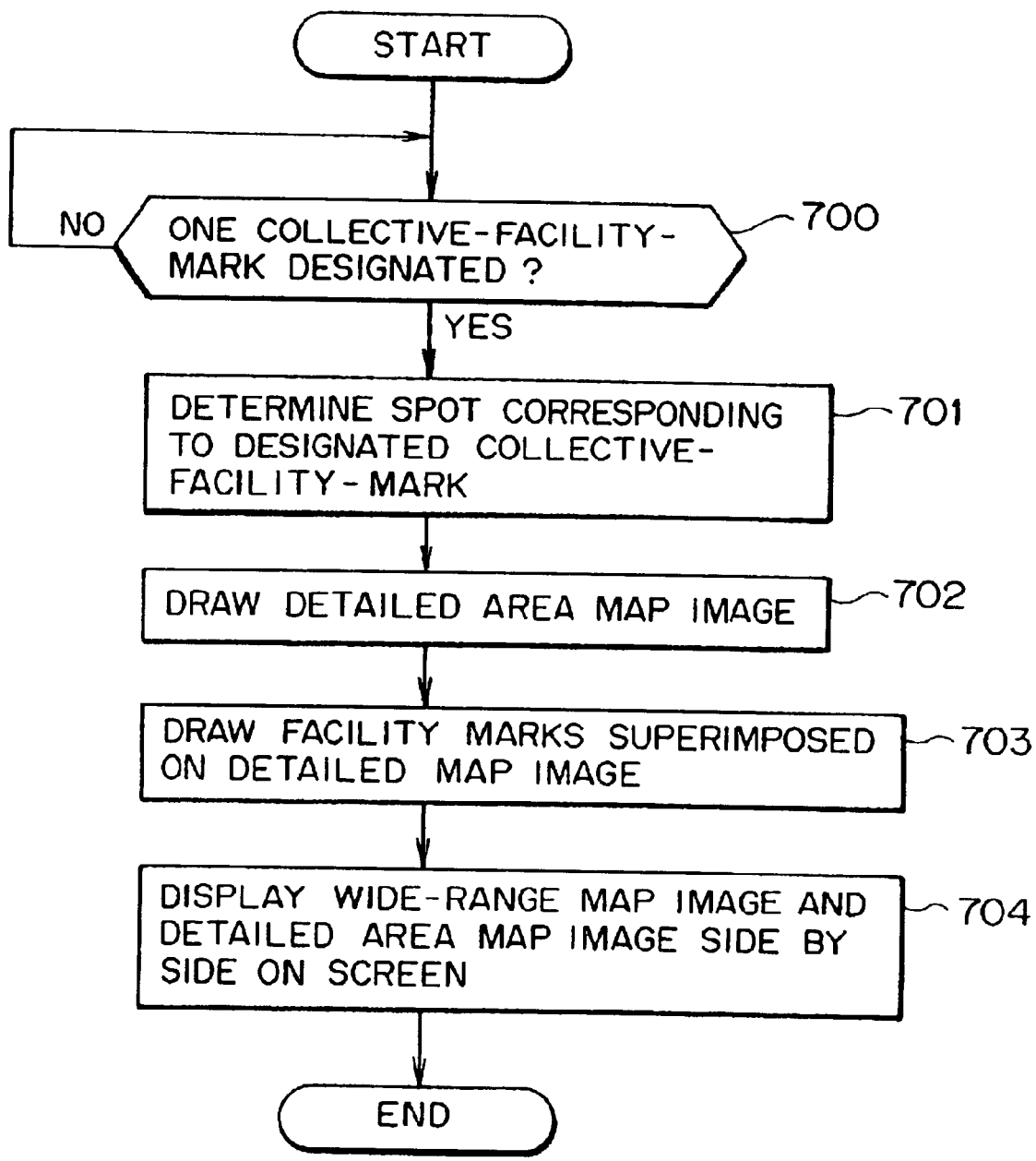
FIG. 16 is a flow chart showing the operation of the navigation device according to the present invention in the case of designating one collective-facility-mark on a wide-range map image and displaying a detailed area map image covering a spot corresponding to the designated collective-facility-mark and its surroundings.

FIG. 16 is a flow chart showing the operation of the navigation device according to the present invention in the case of designating one collective-facility-mark on the wide-range map image and displaying a detailed area map image covering the spot corresponding to the designated collective-facility-mark and its surroundings. For instance, the map image having the scaling factor (reduced scale) a of 1/2500 (the so-called 25 m scale) is displayed as the detailed map image.

The input processor 28 determines whether or not one of the collective-facility-marks is designated on the map image by the user's operation of the remote controller 4 (step 700). When there is no collective-facility-mark designated, a negative determination is made, and the determining process in step 700 is repeatedly performed.

As the method for designating a collective-facility-mark, the following methods are suggested: the designating method by moving the cursor mark on the screen toward the display position of the desired collective-facility-mark by the remote control unit 4, and the designating method by pressing a specific key such as the nearby key to designate the nearest collective-facility-mark to the vehicle position or the cursor mark's position.

After a collective-facility-mark is designated, an affirmative determination is made in step 700, and the map drawing section 14 determines a spot corresponding to the designated collective-facility-mark on the map (step 701). Then the map drawing section 14 generates the drawing data for the display of the detailed map image covering the determined spot and its surroundings, and stores it in the VRAM 16 (step 702).

In addition, the facility mark drawing section 22 generates the drawing data for the display of the facility marks superimposed on the detailed map image, and stores it in the VRAM 16 (step 703). Specifically, in step 703 the process of drawing the facility mark is performed in the same way as that shown in FIG. 3.

The image superimposing section 36 reads out the drawing data stored in the VRAM 16 to provide it to the display device 6. Based on the drawing data provided by the image superimposing section 36, the wide-range map image including the collective-facility-mark and the detailed area map image including the facility marks are displayed side by side on the screen of the display device 6 (step 704).

Figure 17:
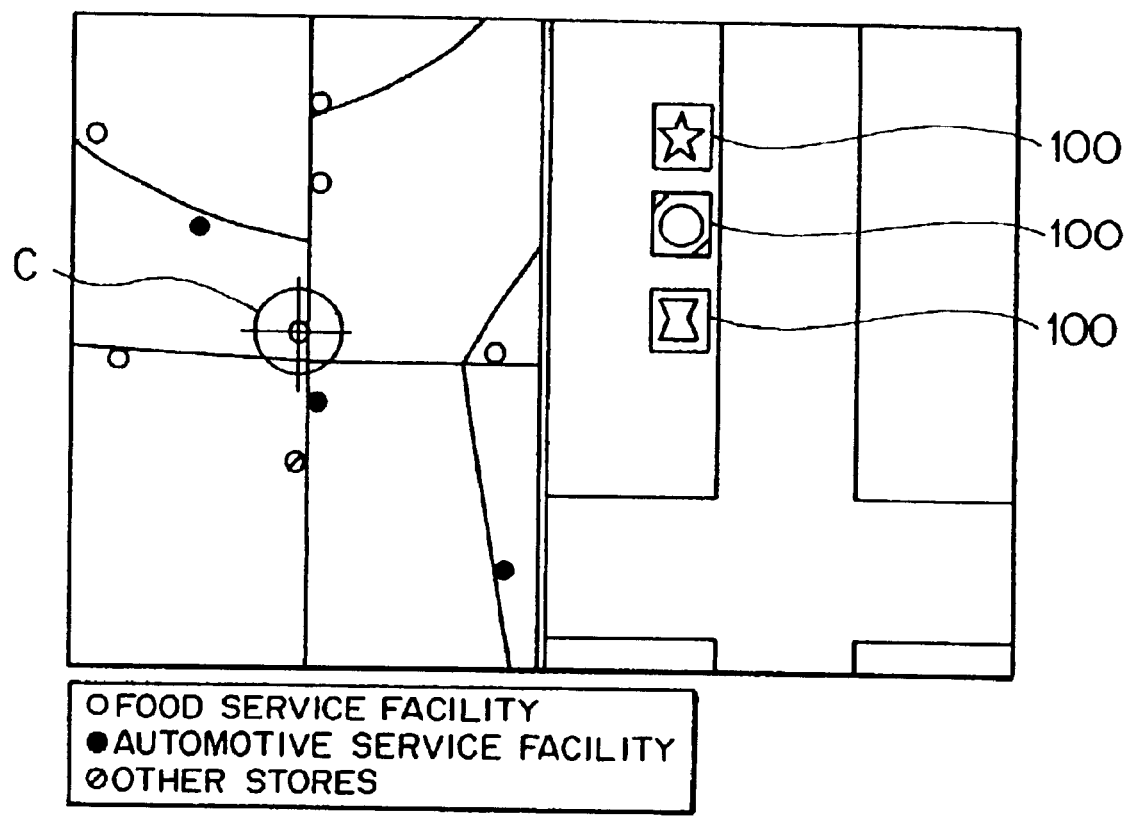
FIG. 17 is a diagram showing an example of the display in a case where there are provided side by side on the screen the wide-range map image and the detailed area map image covering the spot corresponding to the designated collective-facility-mark and its surroundings.

FIG. 17 is a diagram showing an example of the display in a case where the wide-range map image and the detailed area map image covering the vicinity of the location corresponding to the designated collective-facility-mark are displayed side by side. On the left half of the screen the wide-range map image is displayed, while on the right half of the screen the detailed area map image is displayed. When the cursor mark C is moved on the wide-range map image, or when the nearby key is pressed, a third collective-facility-mark is designated and the detailed area map image is also displayed covering the location corresponding to the designated third collective-facility-mark and its surroundings. Further, on this detailed area map image, there are provided three facility marks 100 integrated into the third collective-facility-mark designated on the wide-range map image. Thus, there are provided the detailed area map image that covers the location corresponding to the designated third collective-facility-mark and its surroundings with the facility marks superimposed on the detailed area map image, to thereby facilitate an understanding of the detailed information on the facility marks.

In FIG. 17, on the left half of the screen, there is provided the wide-range map image in a case where the value of the scaling factor $\alpha$ is 1/80000 or less (1/80000≧$\alpha$). FIG. 17 shows a case where the one third collective-facility-mark is designated on the wide-range map image. With respect to the wide-range map, the scope of the invention is not restricted to the described embodiment. For example, the map image displayed by another value of the scaling factor may be the wide-range map image, or the above-mentioned first or second collective-facility-mark may be designated, and the detailed area map image corresponding thereto may be displayed.

Following is an explanation of the operation of the navigation device in a case where the user provides an operating instruction for setting the relationship (or definition) between the above-mentioned collective-facility-mark (the first, second, or third collective-facility-mark), that is, the facility mark whose display pattern is changed, and the kinds or detailed genres of the facilities corresponding to the collective-facility-mark.

Figure 18:
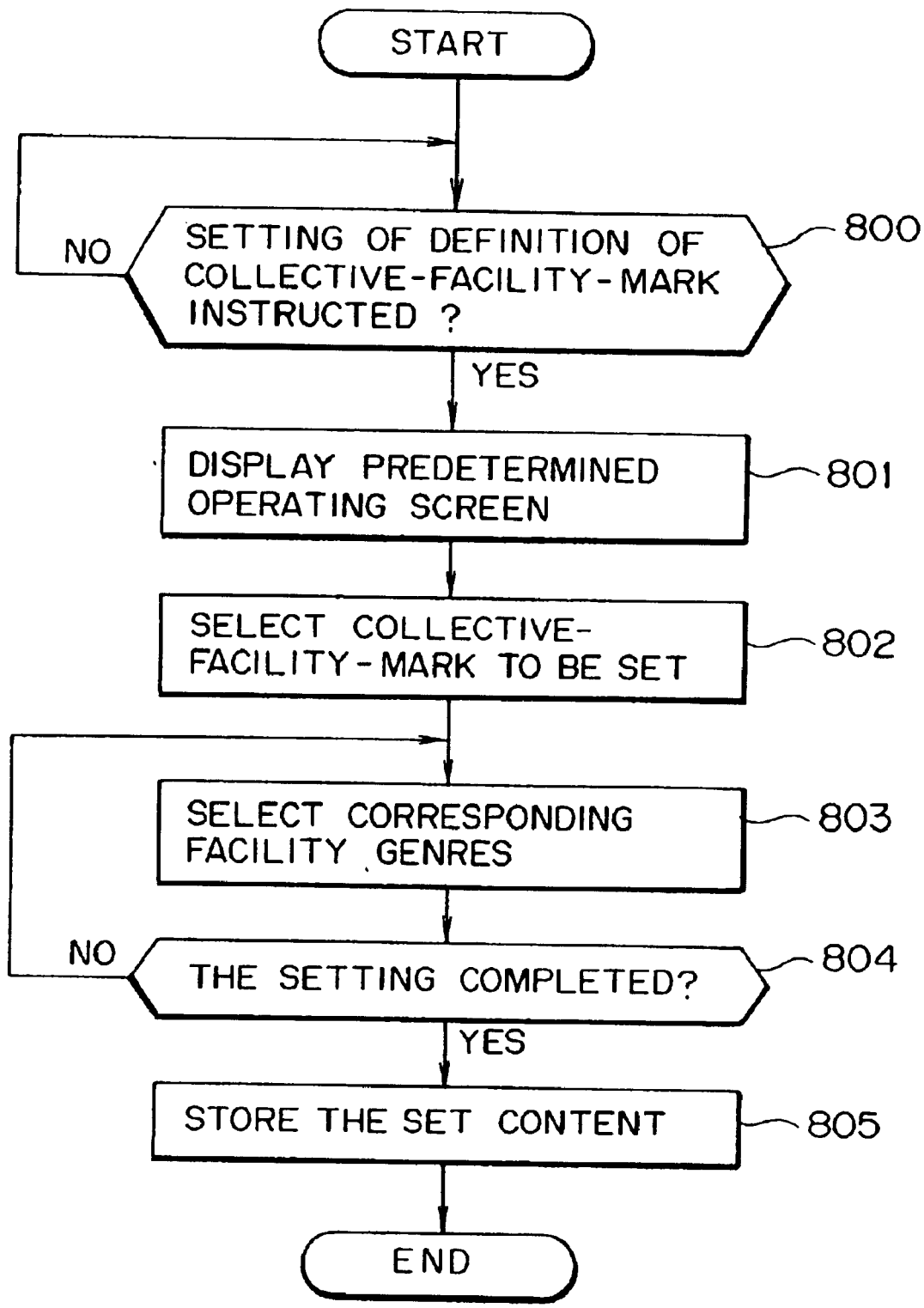
FIG. 18 is a flow chart showing the operation of the navigation device according to the present invention when setting the relationship between the collective-facility-mark and the genres of the facilities corresponding thereto by a user's operation.

FIG. 18 is a flow chart showing the operation of the navigation device according to the present invention when setting the relationship between the collective-facility-mark and the genres of the facilities corresponding thereto based on the user's operating instruction.

The mark definition setting section 30 determines whether or not there is provided an operating instruction for setting the relationship between the collective-facility-mark and the kinds or genres of the facilities corresponding thereto, that is, setting the definition of the collective-facility-mark (step 800). If such an operating instruction is not given by the user, a negative determination is made, and in this case the process in step 800 is repeatedly performed.

When the operating instruction is given to set the definition of the collective-facility-mark, an affirmative determination is made in step 800, and the mark definition setting section 30 instructs the operating screen generator 26 to draw a predetermined operating screen. The operating screen generator 26 draws the operating screen for setting the definition of the collective-facility-mark, such that the predetermined operating screen is displayed on the screen of the display device 6 (step 801).

Next, the mark definition setting section 30 selects the collective-facility-mark to be set according to the user's operating instruction (step 802). When a collective-facility-mark is selected, the mark definition setting section 30 selects the genres or kinds of the facilities corresponding to the selected collective-facility-mark in accordance with the user's operating instruction (step 803).

Figure 19:
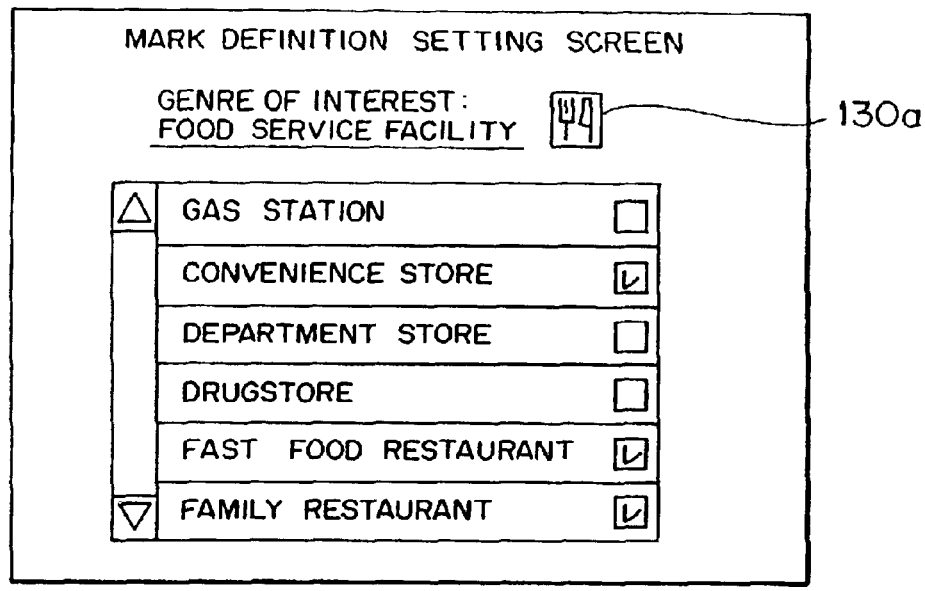
FIG. 19 is a diagram showing an example of the display of an operating screen for setting a definition of the collective-facility-mark.

FIG. 19 is an example of the display of an operating screen for setting the definition of the collective-facility-mark. FIG. 19 shows a case where the second collective-facility-mark 130*a* corresponding to the big genre "food service facility" is selected as the collective-facility-mark of interest. Further, it shows a list of the above-mentioned small genres (gas station, convenience store, and the like), such that the user can freely set the kinds or small genres of the facilities corresponding to the second collective-facility-mark 130*a* indicating "food service facility".

Figure 20:
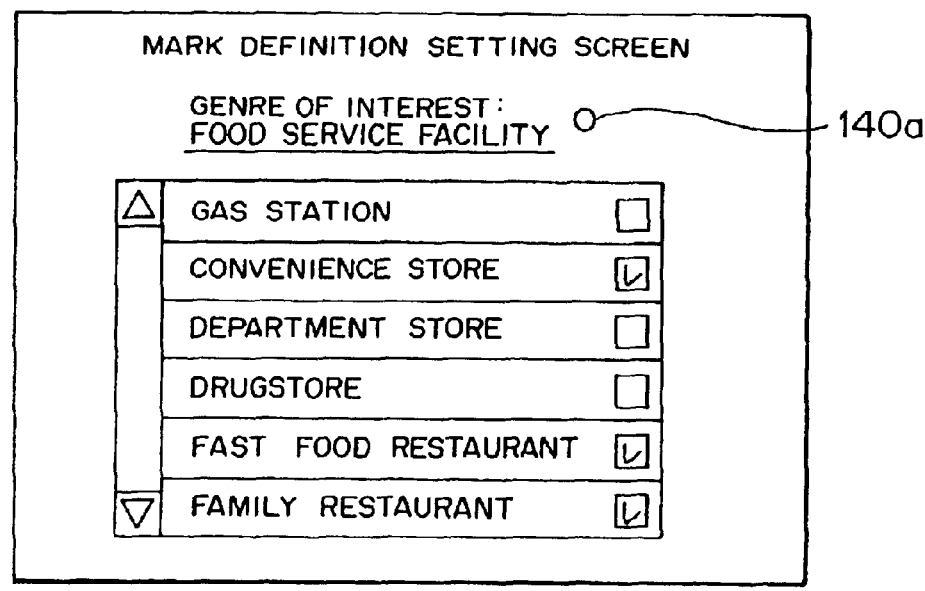
FIG. 20 is a diagram showing another example of the display of an operating screen for setting a definition of the collective-facility-mark.

FIG. 20 shows another example of the display of an operating screen for setting the definition of the collective-facility-mark. FIG. 20 shows a case where the third collective-facility-mark 140*a* corresponding to the big genre "food service facility" is selected as the collective-facility-mark of interest. In the same way as FIG. 19, the operating screen shows a list of the above-mentioned small genres (gas station, convenience store, and the like), such that the user can freely set the kinds or small genres of the facilities corresponding to the third collective-facility-mark 140*a* indicating "food service facility".

Next, the mark definition setting section 30 determines whether or not the operating instruction is provided for completing the setting of the definition of the collective-facility-mark (step 804). While the operating instruction for completing the setting is not provided, a negative determination is made in step 804. In this case returning to step 803, the subsequent processes are repeatedly performed from that step.

When the operating instruction is provided to complete the setting operation, an affirmative determination is made in step 804, and the mark definition setting section 30 stores the set content in the mark definition memory 32 (step 805), thus completing the process.

As described above, the navigation device of the present embodiment draws the facility mark with its display pattern changed in accordance with the scaling factor of the map image, to thereby improve the visibility of the map image including the facility information.

In particular, when the value of the scaling factor α is 1/80000 or less, the facility marks belonging to the same big genre and positioned close to one another are integrated into the third collective-facility-mark, which is drawn in one dot image, whereby the ratio of the areas occupied by the facility marks to the entire area of the map image can be reduced to a relatively smaller value. Accordingly, it is possible to prevent degradation in the visibility of the map image.

When the value of the scaling factor α is 1/20000 or less, according to the value of the scaling factor, the facility marks belonging to the same small genre and positioned close to one another are integrated into the first collective-facility-mark, or the facility marks belonging to the same big genre and positioned close to one another are integrated into the second collective-facility-mark. Thus, the display patterns of the facility marks are changed according to the scaling factor, whereby a plurality of facility marks are not superimposed on one another and are not densely displayed within a small area, making it possible to improve the visibility of the map image.

The described embodiments of the invention are only considered to be preferred and illustrative of the inventive concept, but the scope of the invention is not restricted to such embodiments. Various other arrangements may be devised by one skilled in the art without departing from the spirit and scope of this invention. For example, in the above-mentioned embodiment, when the value of the scaling factor α is 1/40000 or less and greater than 1/80000, the facility marks belonging to the same big genre and positioned close to one another on the screen are integrated into the second collective-facility-mark, which indicates the content of the big genre commonly assigned to the facility marks. However, when a plurality of facility marks belonging to the different big genres are positioned close to one another, these facility marks may be integrated into another collective-facility-mark to be displayed.

Figure 21:
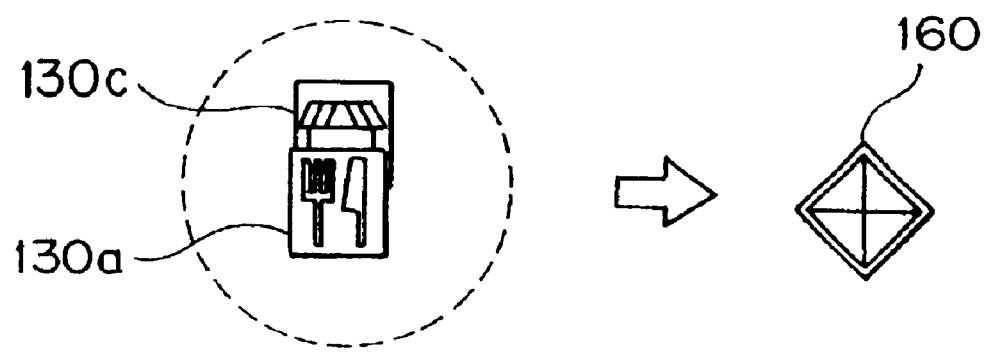
FIG. 21 is a diagram showing an example of drawing another collective-facility-mark which integrates a plurality of second collective-facility-marks belonging to different big genres and positioned close to each other.

FIG. 21 is a diagram showing an example of another collective-facility-mark which integrates a plurality of second collective-facility-marks belonging to different big genres and positioned close to each other. For instance, as shown in FIG. 21, in a case where the second collective-facility-mark 130a corresponding to the big genre "food service facility" is close to the second collective-facility-mark 130b corresponding to the big genre "other stores", a fourth collective-facility-mark 160 having a predetermined shape may be prepared in advance and be displayed corresponding to the combination of the big genres, namely, "food service facility+other stores." Similarly, with respect to other combinations of two big genres such as "food service facility+automotive service facility," "automotive service facility+other stores" and the like, a fourth collective-facility-mark having a predetermined shape may be prepared in advance. Thus, the display of the predetermined fourth collective-facility-mark indicating the combination of different big genres can decrease the number of facility marks on the screen, to improve the visibility of the map image.

More than two big genres may be integrated into the fourth collective-facility-mark having the predetermined shape. Further, regarding the relationship between the above-mentioned fourth collective-facility-mark and the plurality of big genres, the mark definition setting section 30 may set the definition as desired according to the user's operating instruction.

If the map image displays a location of a non-franchised store, which is for example a convenience store located only in a limited district, the same facility mark as the above-mentioned first collective-facility-mark (the facility mark indicating the content of small genre) is possibly drawn, but in this case the above-mentioned first collective-facility-mark should be subjected to a highlight processing.

Figure 22:
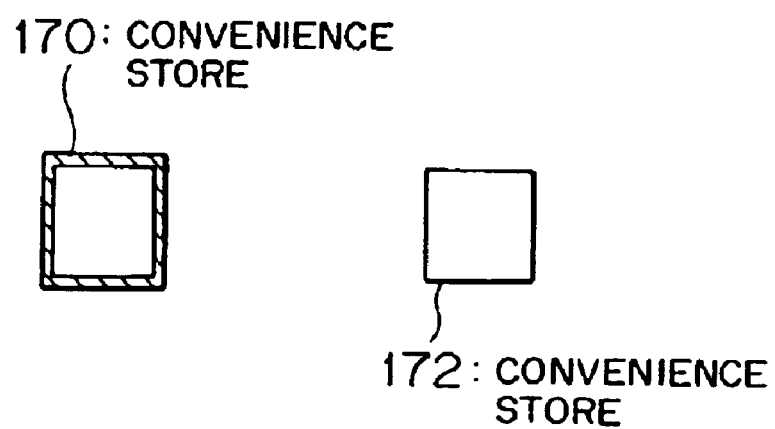
FIG. 22 is a diagram showing an example of another first collective-facility-mark, which is subjected to a highlight processing.

FIG. 22 is a diagram showing an example of the first collective-facility-mark subjected to the highlight processing. Referring to FIG. 22, the first collective-facility-mark 170 is drawn with its frame highlighted in a predetermined highlight color (for convenience, the frame is drawn in a hatch pattern in this figure). The facility mark 172 indicates the location of the non-franchised convenience store. Accordingly, since the first collective-facility-mark that integrates the plurality of facilities belonging to the same small genre is subjected to the highlight processing, even when the non-franchised store is given the same facility mark as the first collective-facility-mark, the facility mark corresponding to the non-franchised store can be clearly distinguished from the first collective-facility-mark. In addition to the above frame emphasizing method, another method for performing the highlight processing can be a method in which the first collective-facility-mark is slightly bigger than other facility marks.

In the described embodiments, the display pattern of the facility mark is changed in response to four cases of the scaling factor α of the map image, namely, the case "α>1/20000", the case "1/20000≧α>1/40000", the case "1/40000≧α>1/80000", and the case "1/80000≧α." However, with respect to the range of the scaling factor's value upon assuming the cases, the scope of the invention is not restricted to the above four cases, and may be revised as desired.

Also, in the described embodiments, the display pattern of the facility mark is changed according to the value of the scaling factor of the map image. But the navigation device of the present invention may first determine whether or not there are any facility marks that are positioned close to one another regardless of the scaling factor, and then change the display patterns of the facility marks in the same way as the above-mentioned embodiments when there are some facility marks positioned close to one another.

As described above, according to the present invention, the image of the facility mark is drawn in a display pattern responsive to the scaling factor of the map image, to thereby improve the visibility of the map image including the facility information.

What is claimed is:

1. A navigation device comprising:

a map drawing section for drawing a map image in accordance with a predetermined scaling factor;

a facility mark drawing section for drawing an image of a facility mark corresponding to a specific facility at a location of the corresponding facility in one of a plurality of different display patterns associated with the facility mark, wherein the different display patterns for the facility mark are different images that correspond to different ranges of scaling factor and said one display pattern is determined in response to said scaling factor; and a display processor for displaying the image of said facility mark drawn by said facility mark drawing section, superimposed on said map image drawn by said map drawing section.

2. A navigation device comprising:
   a map drawing section for drawing a map image in accordance with a predetermined scaling factor;
   a facility mark drawing section for drawing an image of a facility mark corresponding to a specific facility at a location of the corresponding facility in a display pattern in response to said scaling factor, where said display pattern is one of a plurality of different display patterns that are different images associated with said facility mark and that correspond to different ranges of scaling factor; and
   a display processor for displaying the image of said facility mark drawn by said facility mark drawing section, superimposed on said map image drawn by said map drawing section,
   wherein, when the value of the scaling factor is a first value or less, the image of said facility mark is a dot image drawn by said facility mark drawing section, and at a range of scaling factors greater than the first value, the image of said facility mark is drawn in a different display pattern.

3. The navigation device according to claim 2, wherein said dot image is drawn in a color corresponding to a genre to which said specific facility belongs.

4. The navigation device according to claim 3, further comprising a dot definition section for setting a relationship between said dot image and the genre of said specific facility corresponding thereto by a user's operation.

5. The navigation device according to claim 4, further comprising an auxiliary image drawing section for drawing an auxiliary image indicating the relationship between said dot image and the genre of said specific facility corresponding thereto;
   wherein said display processor displays said auxiliary image drawn by said auxiliary image drawing section together with said map image and the image of said facility mark on the same screen.

6. The navigation device according to claim 3, further comprising an auxiliary image drawing section for drawing an auxiliary image indicating the relationship between said dot image and the genre of said specific facility corresponding thereto;
   wherein said display processor displays said auxiliary image drawn by said auxiliary image drawing section together with said map image and the image of said facility mark on the same screen.

7. The navigation device according to claim 6, wherein, when a plurality of said dot images are positioned close to each other on a display screen, said facility mark drawing section integrates the plurality of dot images into one dot image and draws said one dot image.

8. The navigation device according to claim 6, further comprising:
   a dot designating section for designating a specific dot image; and
   a first detailed information drawing section to draw an information image indicating the genre of said specific facility corresponding to the dot image which is designated by said dot designating section, when one of said dot images is designated by the dot designating section.

9. The navigation device according to claim 8, wherein said dot designating section includes a specific key for designating the dot image that is positioned near a present vehicle position or a present position of a cursor, and wherein, when said specific key is operated, said first detailed information drawing section performs a drawing operation for the nearby dot image.

10. The navigation device according to claim 3, further comprising:
    a dot designating section for designating a specific dot image; and
    a first detailed information drawing section to draw an information image indicating the genre of said specific facility corresponding to the dot image which is designated by said dot designating section, when one of said dot images is designated by the dot designating section.

11. The navigation section according to claim 10, wherein said dot designating section includes a specific key for designating the dot image that is positioned near a present vehicle position or a present position of a cursor, and wherein, when said specific key is operated, said first detailed information drawing section performs a drawing operation for the nearby dot image.

12. A navigation device comprising:
    a map drawing section for drawing a map image in accordance with a predetermined scaling factor;
    a facility mark drawing section for drawing an image of a facility mark corresponding to a specific facility at a location of the corresponding facility in a display pattern in response to said scaling factor, where said display pattern is one of a plurality of different display patterns that are different images associated with said facility mark and that correspond to different ranges of scaling factor; and
    a display processor for displaying the image of said facility mark drawn by said facility mark drawing section, superimposed on said map image drawn by said map drawing section,
    wherein, when the value of the scaling factor is a second value or less, and a plurality of said facility marks are positioned close to one another on the display screen, said facility mark drawing section draws a collective-facility-mark indicating a genre to which the plurality of said facility marks belong, said genre being one of a plurality of different genres of said facility marks; and
    wherein, at a range of scaling factors greater than the second value, the image of said facility mark is drawn in a different display pattern.

13. The navigation device according to claim 12, wherein, when the value of the scaling factor is in a range from a third value, which is larger than the second value, through the second value, said facility mark drawing section performs a drawing operation of said collective-facility-mark in a case where the plurality of facility marks belong to the same genre.

14. The navigation device according to claim 13, further comprising:
    a collective-facility-mark designating section for designating a specific collective-facility-mark; and
    a second detailed information drawing section to draw an information image indicating genres of said specific facilities corresponding to said collective-facility-mark which is designated by said collective-facility-mark designating section, when one of said collective-facility-marks is designated by the collective-facility-mark designating section.

15. The navigation device according to claim 12, wherein, when the value of the scaling factor is in a range from a third value, which is larger than the second value, through the second value, said facility mark drawing section performs a drawing operation of said collective-facility-mark for the plurality of facility marks which belong to the same genre; and wherein, when the value of the scaling factor is the second value or less, said facility mark drawing section performs the drawing operation of another collective-facility-mark for the plurality of facility marks which belong to different genres, in addition to the drawing operation of the collective-facility-mark for the facility marks belonging to the same genre.

16. The navigation device according to claim 12, further comprising a collective-facility-mark definition section for setting a relationship between said collective-facility-mark and the genres of said specific facilities corresponding thereto by a user's operation.

17. The navigation device according to claim 12, further comprising:
- a collective-facility-mark designating section for designating a specific collective-facility-mark; and
- a second detailed information drawing section to draw an information image indicating genres of said specific facilities corresponding to said collective-facility-mark which is designated by said collective-facility-mark designating section, when one of said collective-facility-marks is designated by the collective-facility-mark designating section.

18. The navigation device according to claim 17, wherein said collective-facility-mark designating section includes a specific key for designating the collective-facility-mark that is positioned near a present vehicle position or a present position of a cursor, and wherein, when said specific key is operated, said second detailed information drawing section performs a drawing operation for the nearby collective-facility-mark.

19. A navigation device comprising:
- a map drawing section for drawing a map image in accordance with a predetermined scaling factor;
- a facility mark drawing section for drawing an image of a facility mark corresponding to a specific facility at a location of the corresponding facility in a display pattern in response to said scaling factor, where said display pattern is one of a plurality of different display patterns that are different images associated with said facility mark and that correspond to different ranges of scaling factor; and
- a display processor for displaying the image of said facility mark drawn by said facility mark drawing section, superimposed on said map image drawn by said map drawing section, wherein, when the value of the scaling factor is greater than a third value and said facility is related to specific building, said map drawing section draws an outline of said specific building, and said facility mark drawing section draws the image of the facility mark relating to the building within said outline of the building, and at a range of scaling factor less than or equal to the third value, the image of said facility mark is drawn in a different display pattern.

20. A method for displaying a facility mark indicating the location of a facility on a map image using a navigation device that superimposes the facility mark on the map image, comprising:

drawing the map image in accordance with a predetermined scaling factor;

drawing an image of the facility mark corresponding to the specific facility at a location of the corresponding facility in one of a plurality of different display patterns associated with the facility mark, wherein the different display patterns for the facility mark are different images that correspond to different ranges of scaling factor, and said one of a plurality of different display patterns is determined in response to said scaling factor; and displaying the image of said facility mark superimposed on said map image.

* * * * *